(12) United States Patent
Osawa

(10) Patent No.: US 11,067,782 B2
(45) Date of Patent: Jul. 20, 2021

(54) MICROSCOPE OBJECTIVE

(71) Applicant: OLYMPUS CORPORATION, Hachioji (JP)

(72) Inventor: Kengo Osawa, Kamiina (JP)

(73) Assignee: OLYMPUS CORPORATION, Tokyo (JP)

( * ) Notice: Subject to any disclaimer, the term of this patent is extended or adjusted under 35 U.S.C. 154(b) by 239 days.

(21) Appl. No.: 16/287,754

(22) Filed: Feb. 27, 2019

(65) Prior Publication Data

US 2019/0324248 A1    Oct. 24, 2019

(30) Foreign Application Priority Data

Apr. 19, 2018    (JP) .............................. JP2018-080948

(51) Int. Cl.
*G02B 21/02* (2006.01)
*G02B 13/00* (2006.01)

(52) U.S. Cl.
CPC .......... *G02B 21/02* (2013.01); *G02B 13/006* (2013.01)

(58) Field of Classification Search
CPC .......... G02B 13/16; G02B 9/64; G02B 21/00; G02B 21/02; G02B 15/143; G02B 13/09; G02B 9/06
See application file for complete search history.

(56) References Cited

U.S. PATENT DOCUMENTS 5,191,473 A * 3/1993 Kashima ................ G02B 21/02
359/658
2006/0056039 A1   3/2006 Sakakura et al.

FOREIGN PATENT DOCUMENTS

JP    S61275810 A    12/1986
JP    2006065023 A    3/2006

OTHER PUBLICATIONS

Extended European Search Report (EESR) dated Sep. 23, 2019 issued in European Application No. 119159722.8.

* cited by examiner

*Primary Examiner* — Joseph P Martinez
*Assistant Examiner* — Vipin Patel
(74) *Attorney, Agent, or Firm* — Holtz, Holtz & Volek PC

(57) ABSTRACT

An objective includes the first and second groups. The first group includes the first cemented lens with a concave surface facing the object side, the first and second single lenses having positive power, and the second cemented lens with a concave surface facing an image side. The second group includes the third cemented lens with a concave surface facing the object side and a third single lens having positive power. Each of the cemented lenses combines one positive lens with one negative lens. The objective satisfies the following expressions.

$$0.31 \leq NA < 1 \qquad (1)$$

$$2.2 \leq H/f \leq 3.3 \qquad (2)$$

$$0 < a/b \leq 1.2 \qquad (3)$$

Here, NA is a numerical aperture, f is a focal length at e-line, H is a distance from an object surface to a lens surface closest to an image, a is the sum of air-gap distances in the first group, and b is a thickness of a negative lens in the second cemented lens.

20 Claims, 17 Drawing Sheets

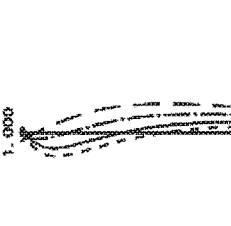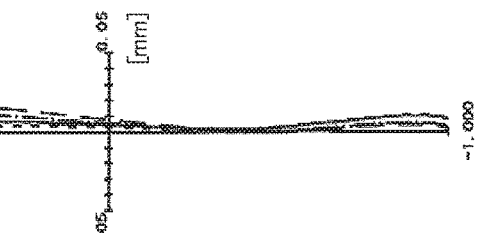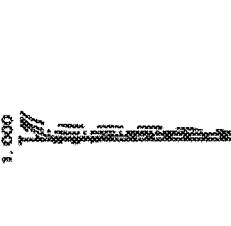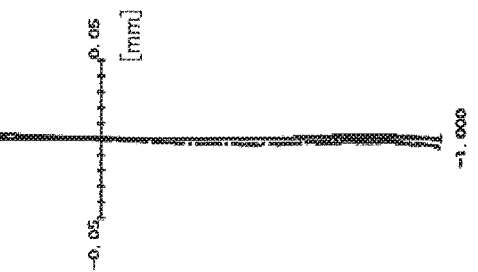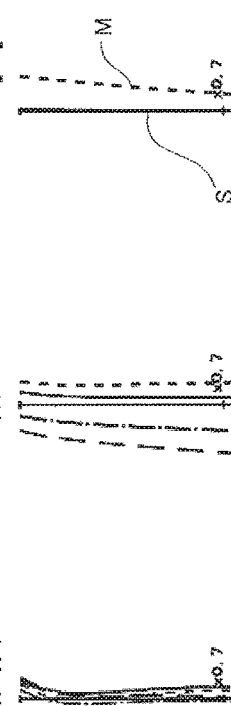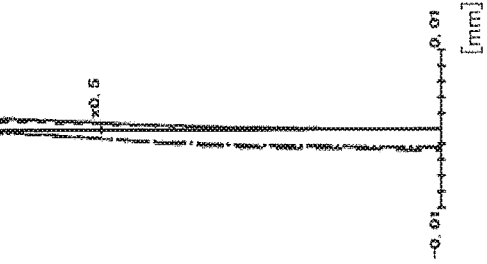

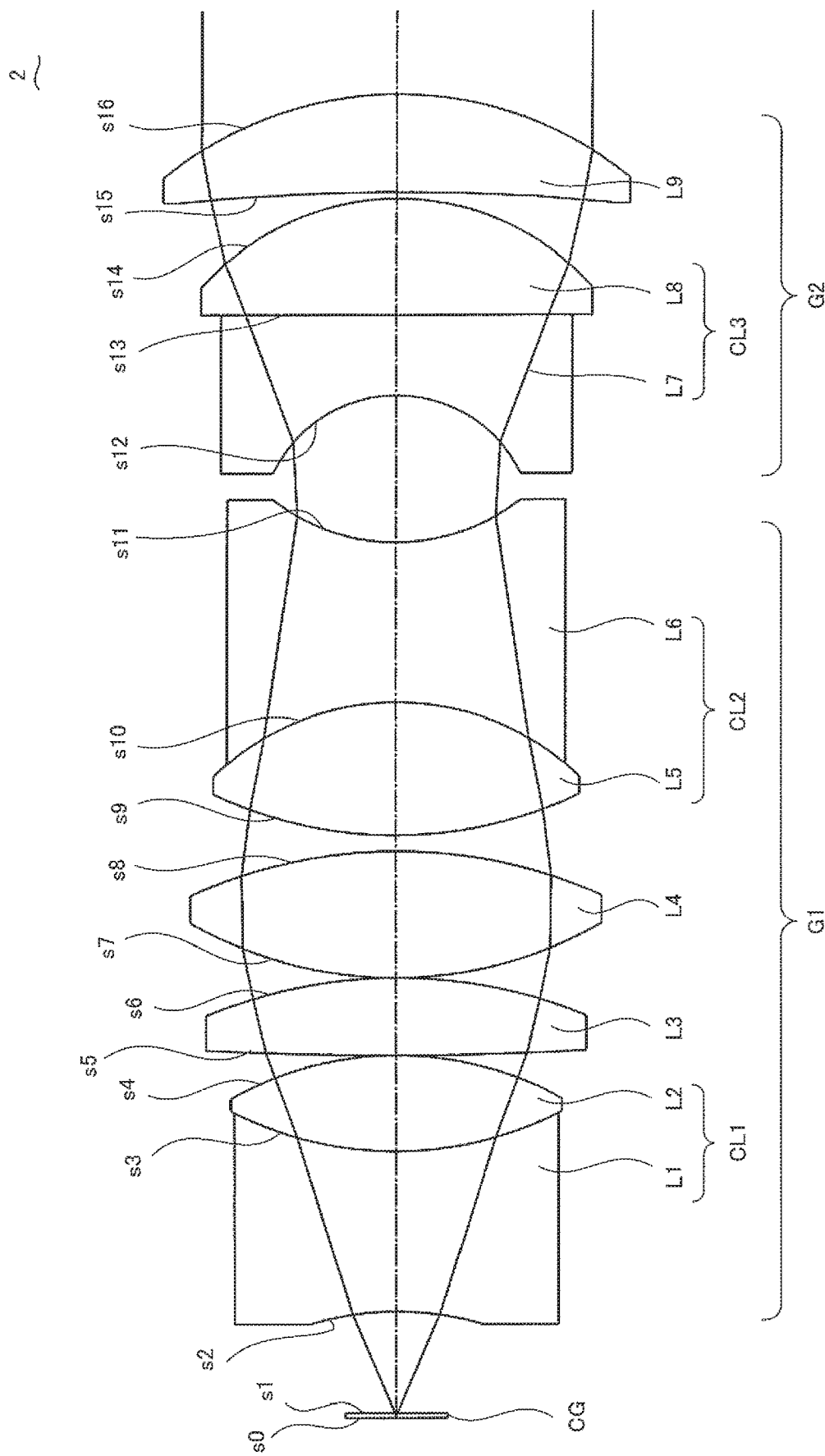
F I G. 3

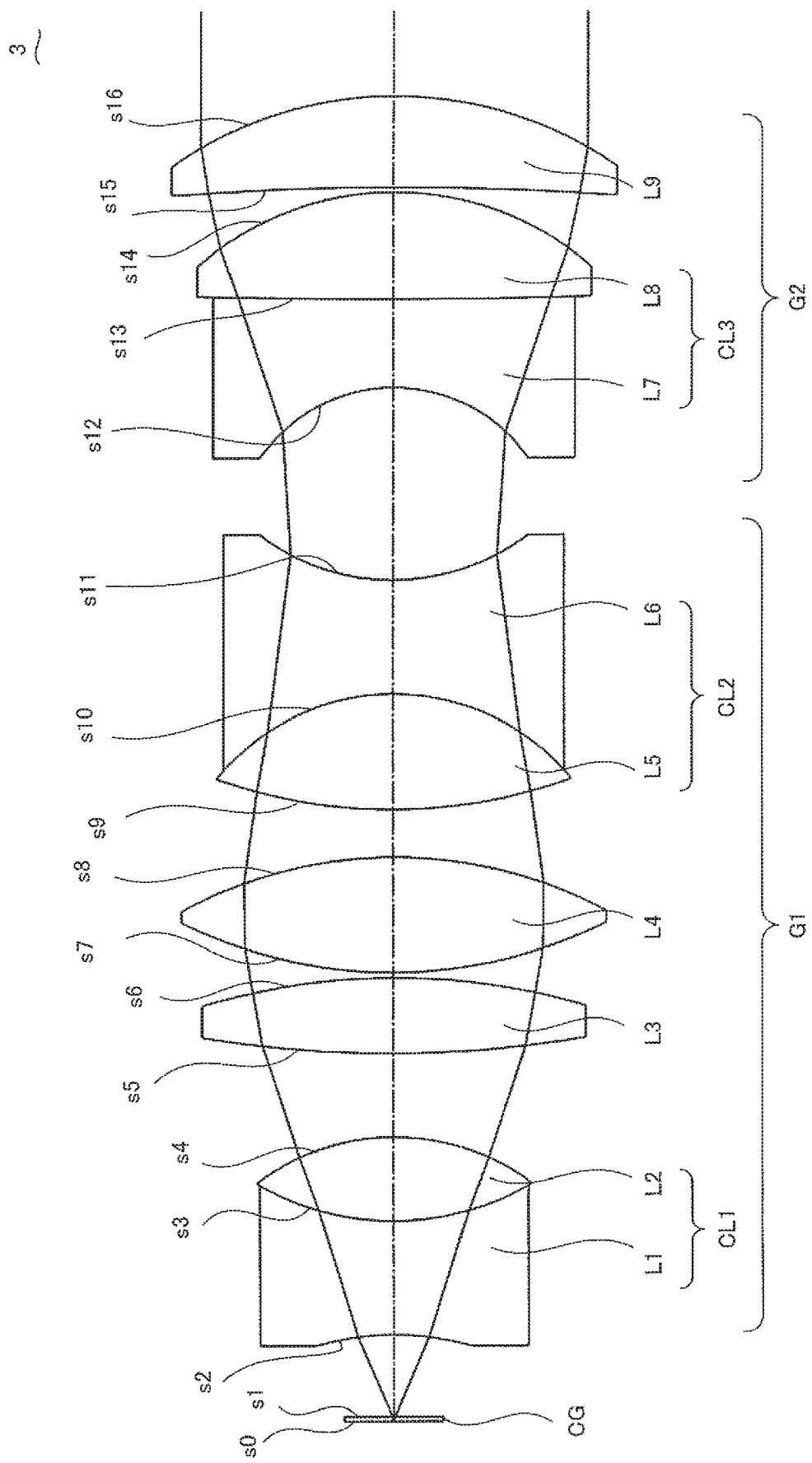
F I G. 5

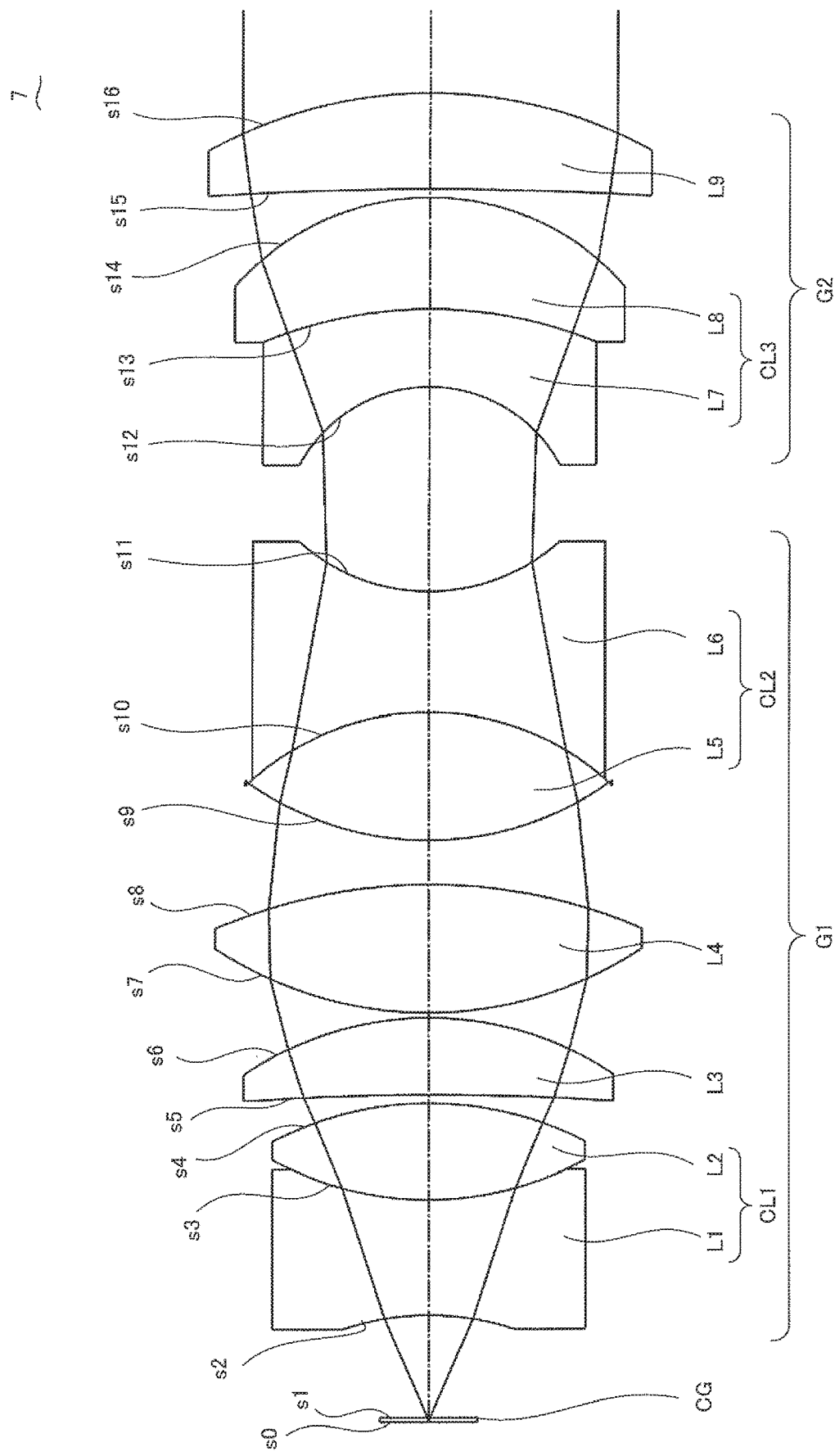
F I G. 13

FIG.16A  FIG.16B  FIG.16C  FIG.16D  FIG.16E  FIG.16F

MICROSCOPE OBJECTIVE

CROSS REFERENCE TO RELATED APPLICATIONS

This application is based upon and claims the benefit of priority from prior Japanese Patent Application No. 2018-080948, filed Apr. 19, 2018, the entire contents of which are incorporated herein by this reference.

BACKGROUND OF THE INVENTION

Field of the Invention

The disclosure of the present specification relates to a microscope objective.

Description of the Related Art

In the market for bio-related researches in recent years, microscope objectives are expected to be usable in fluorescence observation utilizing excitation in a wide range of wavelength from a short wavelength of around 400 nm to a near-infrared wavelength. In addition, in consideration of the usability at the time of observations, the objective is desirably a dry objective.

SUMMARY OF THE INVENTION

The microscope objective according to one mode of the present invention is a dry microscope objective includes the first lens group and the second lens group, which are arranged in this order from an object side. The first lens group includes the first cemented lens with a concave surface facing the object side, the first single lens having a positive refractive power, the second single lens having a positive refractive power, and the second cemented lens with a concave surface facing an image side, which are arranged in this order from the object side. The second lens group includes the third cemented lens with a concave surface facing the object side and a third single lens having a positive refractive power, which are arranged in this order from an object side. Each of the first cemented lens, the second cemented lens, and the third cemented lens is a cemented doublet lens that combines one positive lens with one negative lens. The microscope objective satisfies the following conditional expressions.

$$0.31 \leq NA < 1 \tag{1}$$

$$2.2 \leq H/f \leq 3.3 \tag{2}$$

$$0 < a/b \leq 1.2 \tag{3}$$

Here, NA is a numerical aperture of the microscope objective on the object side, f is a focal length of the microscope objective at the e-line, H is a distance from an object surface to a lens surface of the second lens group closest to an image, a is the sum of air-gap distances in the first lens group, and b is a thickness of a negative lens included in the second cemented lens.

The microscope objective according to another mode of the present invention is a dry microscope objective includes the first lens group and the second lens group, which are arranged in this order from an object side. The first lens group includes the first cemented lens with a concave surface facing the object side, the first single lens having a positive refractive power, the second single lens having a positive refractive power, and the second cemented lens with a concave surface facing an image side, which are arranged in this order from the object side. The second lens group includes the third cemented lens with a concave surface facing the object side and a third single lens having a positive refractive power, which are arranged in this order from an object side. Each of the first cemented lens, the second cemented lens, and the third cemented lens is a cemented doublet lens that combines one positive lens with one negative lens. The microscope objective satisfies the following conditional expressions.

$$0.31 \leq NA < 1 \tag{1}$$

$$2.2 \leq H/f \leq 3.3 \tag{2}$$

$$42 \leq vd(-) \leq 55 \tag{5}$$

$$0.993 \leq \theta hF(-) \leq 1.036 \tag{6}$$

Here, NA is a numerical aperture of the microscope objective on the object side, f is a focal length of the microscope objective at the e-line, H is a distance from an object surface to a lens surface of the second lens group closest to an image, vd(−) is an Abbe number of a first negative lens at d-line, the first negative lens being a negative lens included in any one of the first cemented lens, the second cemented lens and the third cemented lens, and θhF(−) is a partial dispersion ratio based on h-line and F-line for the first negative lens.

The microscope objective according to yet another mode of the present invention is a dry microscope objective includes the first lens group and the second lens group, which are arranged in this order from an object side. The first lens group includes the first cemented lens with a concave surface facing the object side, the first single lens having a positive refractive power, the second single lens having a positive refractive power, and the second cemented lens with a concave surface facing an image side, which are arranged in this order from the object side. The second lens group includes the third cemented lens with a concave surface facing the object side and a third single lens having a positive refractive power, which are arranged in this order from an object side. Each of the first cemented lens, the second cemented lens, and the third cemented lens is a cemented doublet lens that combines one positive lens with one negative lens. The microscope objective satisfies the following conditional expressions.

$$0.31 \leq NA < 1 \tag{1}$$

$$2.2 \leq H/f \leq 3.3 \tag{2}$$

$$0 \leq |\Delta z|/DOF_e \leq 4.5 \tag{9}$$

Here, NA is a numerical aperture of the microscope objective on the object side, f is a focal length of the microscope objective at the e-line, H is a distance from an object surface to a lens surface of the second lens group closest to an image, $|\Delta z|$ is a difference between an axial best position at h-line and an axial best position at e-line, and $DOF_e$ is a depth of focus at e-line.

BRIEF DESCRIPTION OF THE DRAWINGS

The present invention will be more apparent from the following detailed description when the accompanying drawings are referenced.

FIG. 2A to FIG. 2F are diagrams of aberrations of the objective 1 in FIG. 1;

FIG. 3 is a cross-sectional view of the objective 2 according to Embodiment 2 of the present invention;

FIG. 5 is a cross-sectional view of the objective 3 according to Embodiment 3 of the present invention;

FIG. 13 is a cross-sectional view of the objective 7 according to Embodiment 7 of the present invention;

Figures 16A, 16B, 16C, 16D, 16E, 16F:
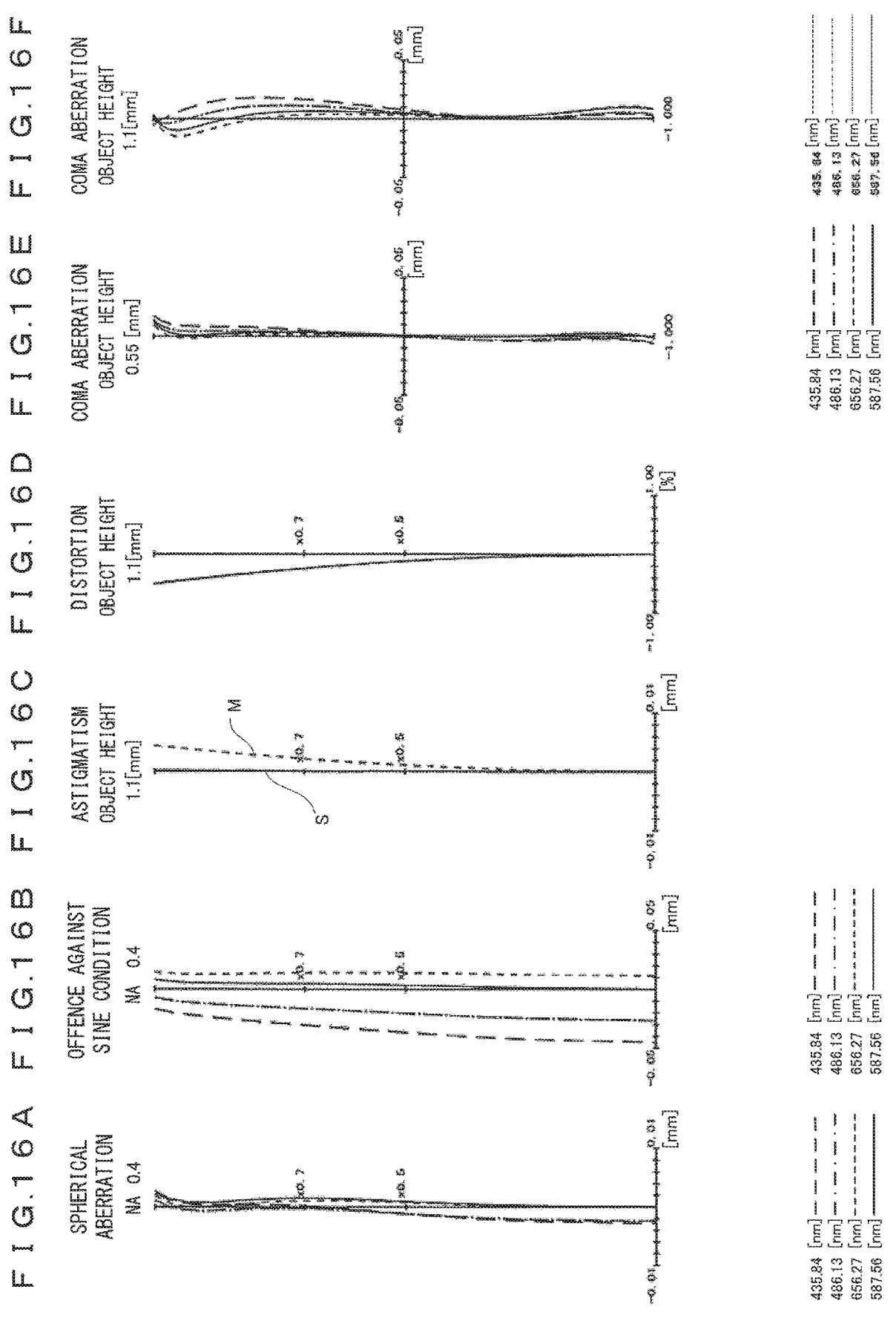

FIG. 16A to FIG. 16F are diagrams of aberrations of the objective 8 in FIG. 15.

DESCRIPTION OF THE EMBODIMENTS

Figure 1:
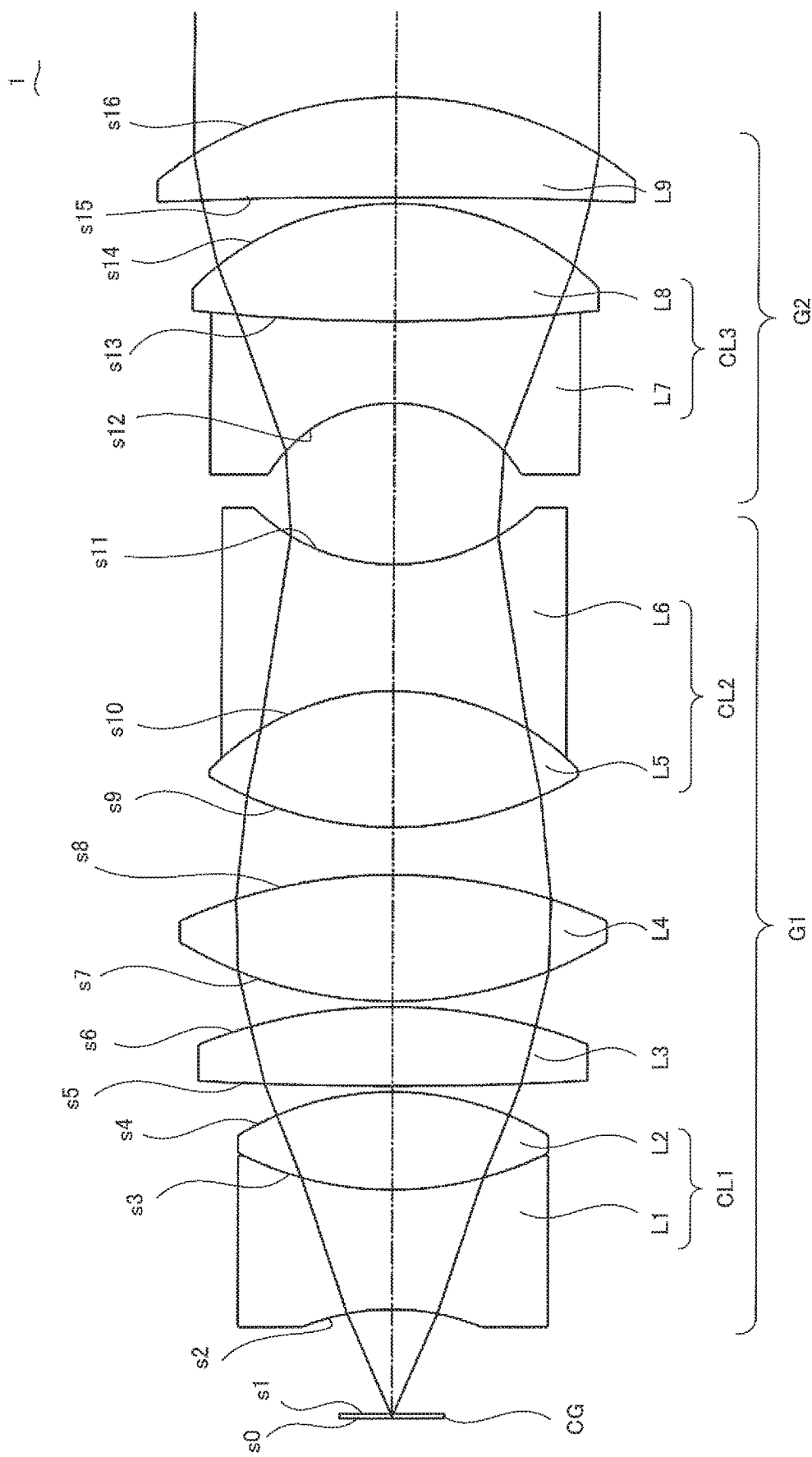
FIG. 1 is a cross-sectional view of the objective 1 according to Embodiment 1 of the present invention.
Figure 4:
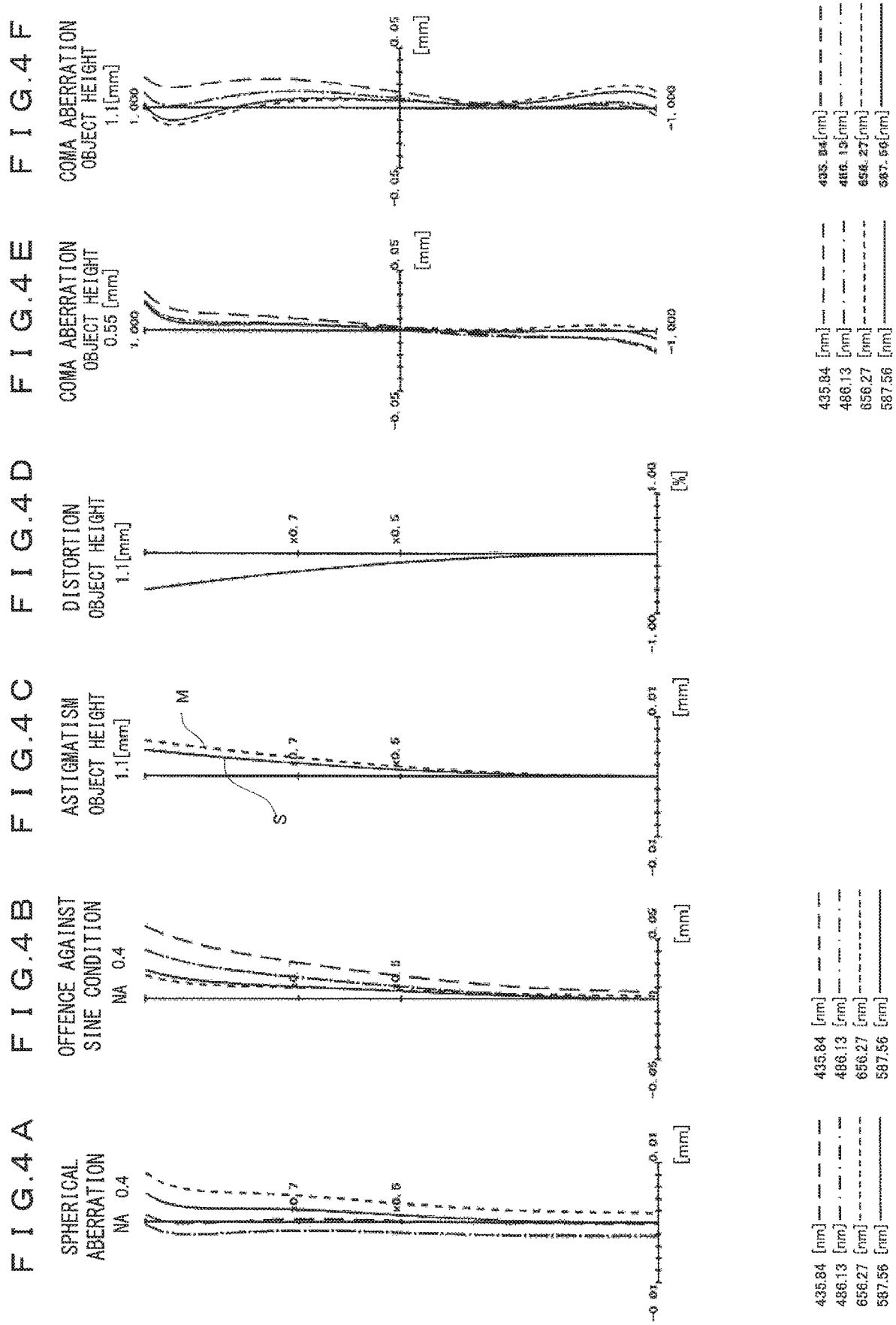
FIG. 4A to FIG. 4F are diagrams of aberrations of the objective 2 in FIG. 3.
Figures 6A, 6B, 6C, 6D, 6E, 6F:
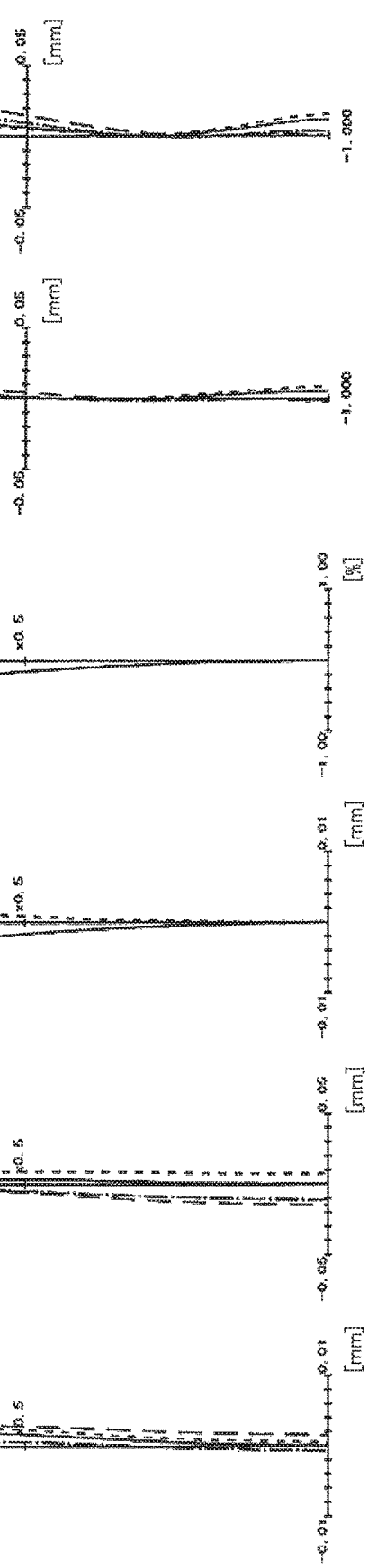
FIG. 6A to FIG. 6F are diagrams of aberrations of the objective 3 in FIG. 5.

Japanese Laid-open Patent Publication No. 2006-065023 discloses an objective that favorably correct various aberrations in a wavelength range from the g-line (434.75 nm) to the t-line (1013.98 nm). However, the objective disclosed in Japanese Laid-open Patent Publication No. 2006-065023 does not address correction of the chromatic aberrations in a short wavelength region near the h-line (404.06 nm). For example, when simultaneous multiwavelength excitation is conducted with use of a confocal fluorescence microscope by irradiating a specimen with a light in a wavelength region near the h-line and a light in a wavelength region from the g-line to the t-line, color shift may occur in fluorescence observation without sufficient chromatic aberration correction in a wavelength region from the h-line to the t-line, and the credibility of the obtained data is decreased. For that reason, an optical system that has favorable imaging performances from a short-wavelength region including the h-line to a near-infrared wavelength region has been eagerly anticipated.

In the following description, an objective according to one of the embodiments in the present application (hereinafter simply referred to as the objective) is explained in detail. The objective is an infinity-corrected microscope objective used in combination with a tube lens. The objective is a so-called dry objective that is used for observations of a specimen with air mediating between the specimen and the objective. The objective is an objective that favorably corrects various aberrations from a short-wavelength region to a near-infrared wavelength region.

The objective is configured to have two groups. The objective includes the first lens group and the second lens group arranged in this order from the object side. The first lens group and the second lens group are arranged so that a concave surface of the first lens group and a concave surface of the second lens group face each other. A boundary between the first lens group and the second lens group can be identified by this characteristics.

The first lens group includes a cemented lens with a concave surface facing the object side (hereinafter referred to as the first cemented lens), a single lens having a positive refractive power (hereinafter referred to as the first single lens), a single lens having a positive refractive power (hereinafter referred to as the second single lens), and a cemented lens with a concave surface facing the image side (hereinafter referred to as the second cemented lens), and these lenses are arranged in this order from the object side.

The second lens group includes a cemented lens with a concave surface facing the object side (hereinafter referred to as the third cemented lens) and a single lens having a positive refractive power (hereinafter referred to as the third single lens), and these lenses are arranged in this order from the object side.

Note that each of the first cemented lens, the second cemented lens, and the third cemented lens is a cemented doublet lens in which one positive lens and one negative lens are combined.

In the objective configured as above, divergent light emitted from an object point are tentatively converted into convergent light. Afterwards, the convergent light are converted into divergent light and the divergent light exit from the second lens group as collimated light. In this manner, the objective corrects various aberration including the Petzval sum by changing the ray height.

The first cemented lens and the second cemented lens are arranged in a region in which a change in the ray height is significant and the height of an axial marginal ray is high within the first lens group. Use of a single lens instead of a cemented lens in such a region will result in significantly bending light beams at each lens surface, and a larger amount of various aberrations including axial chromatic aberrations will emerge. In this case, it becomes difficult to favorably correct the aberrations by the objective per se. On the other hand, by placing the first cemented lens and the second cemented lens, the objective can moderately bend rays. Consequently, various aberrations such as axial chromatic aberrations and spherical aberrations can be favorably corrected by the objective itself. In particular, because the first cemented lens moderately bends off-axis rays, the first cemented lens has a strong correction effect against coma aberrations and chromatic aberration of magnification.

The third cemented lens is arranged in a region in which a change in a ray angle is moderate and the axial marginal ray height is high within the second lens group. When the third cemented lens is arranged in a region in which a change in a ray angle is moderate, axial chromatic aberrations are mostly corrected while the influences on spherical aberrations and coma aberrations are limited. In addition, field curvatures and distortions emerged in the first lens group can also be corrected. When a single lens is used instead of the third cemented lens, rays are bended to a great extent at each lens surface. As a result, a large amount of various aberrations such as axial chromatic aberrations, spherical aberrations, coma aberrations, and field curvatures will emerge, and it will be difficult to favorably correct these aberrations by the lens itself.

The objective satisfies the following conditional expressions (1) to (3).

$$0.31 \leq NA < 1 \quad (1)$$

$$2.2 \leq H/f \leq 3.3 \quad (2)$$

$$0 < a/b \leq 1.2 \quad (3)$$

Here, NA is a numerical aperture of the objective on the object side. f is a focal length of the objective at the e-line. H is a distance from an object surface to a lens surface closest to the image within the second lens group (i.e., the endmost surface of the objective). a is the sum of air-gap distances in the first lens group. An air-gap distance is a distance of a gap between adjacent lens surfaces included in the first lens group and the gap is filled with air. b is the thickness of a negative lens included in the second cemented lens. Note that both a and H are distances on the optical axis of the objective and b is the thickness measured on the optical axis of the objective.

The conditional expression (1) defines an application range of a resolving power and brightness. Because the objective is a dry objective, NA is less than 1 (NA<1). NA being less than 0.31 often results in a reduced resolving power and lack of brightness of an image. In particular, the lack of brightness is saliently caused since fluorescence observations are conducted with a limited amount of illumination light in order to reduce cytotoxicity.

The conditional expression (2) defines an application range of a magnification and a parfocal distance of the objective. In consideration of the parfocal distance being limited to a certain extent, H/f reduced to less than 2.2 results in a lower magnification and consequently a too large field of view. In this case, placement of the first cemented lens with a concave surface facing the object side becomes difficult. H/f exceeding 3.3 results in a higher magnification and requires a larger positive power. Note that in the objective that satisfies the conditional expression (2), the magnification is around 10× and the parfocal distance is around 45 to 65 mm.

When the thickness of a negative lens in the second cemented lens is large with respect to the air-gap distances within the first lens group, rays of which the axial marginal ray height is high will pass through the cemented surface of the second cemented lens. More specifically, when a/b is 1.2 or less, a sufficiently high axial marginal ray will pass through the cemented surface. For that reason, when the conditional expression (3) is satisfied, axial chromatic aberrations can be favorably corrected. Note that because both a and b have positive values, a/b will not be 0 or less. The second cemented lens also has a function to correct axial chromatic aberrations while correcting coma aberrations and field curvatures by gradually lowering the ray height. When a/b exceeds 1.2, the ray height can no longer be gradually lowered by moderately bending the rays with the second cemented lens. In this case, collective correction of coma aberrations and chromatic aberrations becomes difficult.

When the conditional expressions (1) to (3) provided above are satisfied, the objective can favorably correct various aberrations from a short-wavelength region to a near-infrared wavelength region, even if the objective is a low magnification objective.

Note that the objective may satisfy the conditional expression (3-1) or the conditional expression (3-2) instead of the conditional expression (3). Consequently, more favorable correction of the aberrations can be achieved.

$$0 < a/b \leq 1.0 \quad (3-1)$$

$$0 < a/b \leq 0.8 \quad (3-2)$$

The objective may further satisfy the following conditional expression (4).

$$0 < a/c \leq 1.2 \quad (4)$$

Here, c is the thickness of a negative lens included in the first cemented lens, and more precisely, it is the thickness of a negative lens included in the first cemented lens that is measured on the optical axis of the objective.

When the thickness of the negative lens in the first cemented lens is large with respect to the air-gap distances within the first lens group, rays of which the high axial marginal ray height is high will pass through the cemented surface of the first cemented lens. When a/c is 1.2 or less, a sufficiently high axial marginal ray will pass through the cemented lens. For that reason, when the conditional expression (4) is satisfied, axial chromatic aberrations can be more favorably corrected. Note that because both a and c have positive values, a/c will not be 0 or less. The first cemented lens also has a function to correct axial chromatic aberrations while correcting coma aberrations, field curvatures, and chromatic aberrations of magnification by gradually raising the ray height. When a/c exceeds 1.2, the ray height can no longer be gradually raised by moderately bending the rays with the first cemented lens. In this case, collective correction of coma aberrations, field curvatures, and chromatic aberrations becomes difficult.

Note that the objective may satisfy the conditional expression (4-1) or the conditional expression (4-2) instead of the conditional expression (4). Consequently, more favorable correction of the aberrations can be achieved.

$$0 < a/c \leq 1.0 \quad (4-1)$$

$$0 < a/c \leq 0.8 \quad (4-2)$$

The objective converts divergent light into convergent light between the first cemented lens and the second cemented lens. In order to do so, the objective needs to bend the rays to a great extent between the first cemented lens and the second cemented lens. For the purpose of bending rays as moderate as possible in each lens surface, in addition to the first single lens and the second single lens, another single lens (hereinafter referred to as the fourth single lens) having a positive refractive power may be included between the first cemented lens and the second cemented lens. The amount of aberration for the chromatic aberrations and spherical aberrations emerging between the first cemented lens and the second cemented lens can be kept lower than the amount of aberration that emerges in the case of only two single lenses having a positive power. Consequently, aberrations can be more favorably corrected by the objective itself.

Note that a cemented lens can be provided between the first cemented lens and the second cemented lens. However, the manufacturing costs of the objective can be kept lower in the case in which multiple single lenses are provided than the case in which a cemented lens is provided.

Examples in which the objective satisfies the conditional expressions (1) to (3) are provided above. However, the objective may satisfy the following conditional expressions (5) and (6) in addition to the conditional expressions (1) and (2).

$$42 \leq vd(-) \leq 55 \quad (5)$$

$$0.993 \leq \theta hF(-) \leq 1.036 \quad (6)$$

Here, $vd(-)$ is an Abbe number at the d-line of the first negative lens that is a negative lens included in any one of the first cemented lens, the second cemented lens and the third cemented lens. θhF(−) is a partial dispersion ratio based on the h-line and the F-line for the first negative lens. Note that the partial dispersion ratio θhF(−) can be calculated by (nh−nF)/(nF−nC) where nh is a refractive index at the h-line, nF is a refractive index at the F-line, and nC is a refractive index at the C-line.

When negative lenses with the Abbe number being 55 or less at the d-line are included, chromatic aberrations emerging between the C-line and the F-line can be effectively corrected by the negative lens. As a result, chromatic aberration in the visible range can be favorably corrected by the objective itself. In addition, when the first negative lens with θhF(−) being 1.036 or less is included in the negative lenses with the Abbe number at the d-line being 55 or less, the first negative lens prevents excessive correction of chromatic aberrations between the F-line and the h-line. As a result, chromatic aberrations can be favorably corrected in a wide wavelength range.

Note that an optical material that satisfies the conditional expression (5) and has a partial dispersion ratio lower than the lower limit provided in the conditional expression (6) is not widely distributed. An optical material that satisfies the conditional expression (6) and has an Abbe number lower than the lower limit provided in the conditional expression (5) is not widely distributed either. The negative lens material that satisfy the conditional expression (5) and the conditional expression (6) includes, as an example, N-KZFS2, N-KZFS4 and N-KZFS11 manufactured by SCHOTT AG.

When the conditional expressions (1), the conditional expression (2), the conditional expression (5) and the conditional expression (6) provided above are satisfied, the objective can favorably correct various aberrations from a short-wavelength region to a near-infrared wavelength region, even if the objective is a low magnification objective.

Note that in addition to the conditional expressions (1), the conditional expression (2), the conditional expression (5) and the conditional expression (6), the objective may satisfy the conditional expression (3) and may further satisfy the conditional expression (4).

The objective may satisfy the conditional expression (5-1) instead of the conditional expression (5). The objective may satisfy the conditional expression (6-1) instead of the conditional expression (6). Consequently, more favorable correction of the aberrations can be achieved.

$$42 \leq vd(-) \leq 45 \quad (5\text{-}1)$$

$$1.030 \leq \theta hF(-) \leq 1.036 \quad (6\text{-}1)$$

The first negative lens that satisfies the conditional expression (5) and the conditional expression (6) is desirably a negative lens included in the first cemented lens. The axial marginal ray height and the principal ray height are high in the cemented surface of the first cemented lens. For that reason, when the negative lens in the first cemented lens is the first negative lens that satisfies the conditional expression (5) and the conditional expression (6), axial chromatic aberrations and chromatic aberrations of magnification, in particular, can be effectively corrected.

The objective may further satisfy the following conditional expressions (7) and (8).

$$80 \leq vd(+) \leq 100 \quad (7)$$

$$0.970 \leq \theta hF(+) \leq 0.985 \quad (8)$$

Here, vd(+) is an Abbe number at the d-line of the first positive lens that is a positive lens combined with the first negative lens. θhF(+) is a partial dispersion ratio based on the h-line and the F-line for the first positive lens. In other words, the conditional expression (7) and the conditional expression (8) provide properties that are desirably satisfied by the positive lens (the first positive lens) cemented to the negative lens (the first negative lens) that satisfies the conditional expression (5) and the conditional expression (6).

The conditional expression (5) and the conditional expression (6) represents a negative dispersion that is inconsistent with the Herzberger dispersion formula. By combining a negative lens having a negative dispersion with a positive lens that satisfies the conditional expression (7) and the conditional expression (8) and has a positive dispersion, chromatic aberrations can be efficiently corrected. Note that chromatic aberrations from the F-line to the C-line are favorably corrected in particular when the conditional expression (7) is satisfied, and chromatic aberrations from the h-line to the F-line are favorably corrected in particular when the conditional expression (8) is satisfied.

In the above description, an example in which the objective satisfies the conditional expression (1) to the conditional expression (3) and an example in which the objective satisfies the conditional expression (1), the conditional expression (2), the conditional expression (5) and the conditional expression (6) are provided. However, the objective may satisfy the following conditional expression (9) in addition to the conditional expression (1) and the conditional expression (2).

$$0 \leq |\Delta z|/DOF_e \leq 4.5 \quad (9)$$

Here, |Δz| is a difference between an axial best position at the h-line and an axial best position at the e-line. More specifically, it is a difference, or a distance, between an axial position at which the RMS wavefront aberration at the h-line is minimized (denoted as the axial best position at h-line) and an axial position at which the RMS wavefront aberration at the e-line is minimized (denoted as the axial best position at e-line) in the backward ray tracing. $DOF_e$ denotes the depth of focus at the e-line.

Note that the axial position is an axial position in a region on the object side of the objective. In addition, the depth of focus $DOF_e$ is calculated by $DOF_e = \lambda_e/(2 \times NA^2)$ where the e-line wavelength is $\lambda_e$.

Since the fluorescence observation using an excitation light of a short wavelength near the h-line is frequently performed with the microscope optical system in biology, axial chromatic aberration properties at the h-line and at the e-line are important. When $|\Delta z_1|/DOF_e$ is higher than the upper limit, the axial chromatic aberration emerged in an objective will become too large. In this case, without major compensation of the axial chromatic aberration in a tube lens, a large amount of an axial chromatic aberration will emerge on the imaging plane. However, it is difficult in practice to compensate large axial chromatic aberration by means of a tube lens. Here, compensating an aberration by a tube lens means that the tube lens per se needs to have an aberration. Considering the fact that an objective is used in combination with a tube lens and multiple objectives having different aberration properties are switched to one another in use, compensation of axial chromatic aberrations by a tube lens is not preferable. By satisfying the conditional expression (9), axial chromatic aberrations can be favorably corrected by the objective alone. In particular, even when a light of a short wavelength such as the h-line is used as an excitation light, the axial chromatic aberration can be favorably corrected.

When the conditional expressions (1), the conditional expression (2) and the conditional expression (9) provided above are satisfied, the objective can favorably correct various aberrations from a short-wavelength region to a near-infrared wavelength region, even if the objective is a low magnification objective.

Note that in addition to the conditional expressions (1), the conditional expression (2) and the conditional expression (9), the objective may satisfy the conditional expression (3) and may further satisfy the conditional expression (4). In addition to the conditional expressions (1), the conditional expression (2) and the conditional expression (9), the objective may satisfy the conditional expression (5) and the conditional expression (6) and may further satisfy the conditional expression (7) and the conditional expression (8).

In the following description, the embodiments of the above-described objective are explained in detail.

Embodiment 1

FIG. 1 is a cross-sectional view of an objective 1 according to the present embodiment. The objective 1 includes the first lens group G1 and the second lens group G2 that are arranged in this order from the object side. Note that the objective 1 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens and these lenses are arranged in this order from the object side. In other words, the cemented lens CL1 is a cemented doublet meniscus lens that combines a positive lens with a negative lens. Each of the lens L3 and the lens L4 is a single lens and is a biconvex lens. The cemented lens CL2 consists of a lens L5 that is a biconvex lens and a lens L6 that is a biconcave lens and these lenses are arranged in this order from the object side. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power and these lenses are arranged in this order from the object side.

The cemented lens CL3 consists of a lens L7 that is a biconcave lens and a lens L8 that is a biconvex lens, and these lenses are arranged in this order from the object side. In other words, the cemented lens CL3 is a cemented doublet meniscus lens that combines a positive lens with a negative lens. The lens L9 is a single lens and is a meniscus lens with a concave surface facing the object side.

Specific data of the objective 1 is provided below.

NA=0.4, f=18 mm, object height=1.1 mm, H=46.80 mm, a=2.09 mm, b=4.49 mm, c=4.22 mm, |Δz|=7.09 μm, $DOF_e$=1.70647 μm The lens data of the objective 1 is provided below. Note that INF in the lens data denotes infinity (∞).

| Objective 1 | | | | | |
|---|---|---|---|---|---|
| s | r | d | nd | vd | glass material |
| 0 | ∞ | 0.17 | 1.52397 | 54.41 | glass 8 |
| 1 | ∞ | 3.7115 | | | |
| 2 | −8.3986 | 4.2209 | 1.61336 | 44.49 | glass 6 |
| 3 | 12.1766 | 3.4801 | 1.497 | 81.54 | glass 2 |
| 4 | −10.5755 | 0.2002 | | | |
| 5 | 125.8891 | 2.8103 | 1.43875 | 94.66 | glass 1 |
| 6 | −18.6353 | 0.2005 | | | |
| 7 | 14.7946 | 4.4811 | 1.43875 | 94.66 | glass 1 |
| 8 | −18.4565 | 1.6867 | | | |
| 9 | 12.8039 | 4.81 | 1.43875 | 94.66 | glass 1 |
| 10 | −9.1339 | 4.4901 | 1.51633 | 64.14 | glass 3 |
| 11 | 7.2434 | 5.7114 | | | |
| 12 | −5.268 | 2.9001 | 1.51633 | 64.14 | glass 3 |
| 13 | 70.4239 | 4.17 | 1.43875 | 94.66 | glass 1 |
| 14 | −10.1954 | 0.2264 | | | |
| 15 | −199.538 | 3.53 | 1.43875 | 94.66 | glass 1 |
| 16 | −13.7504 | | | | |

Here, s denotes a surface number, r denotes a radius of curvature (mm), d denotes a surface interval (mm), nd denotes a refractive index at the d-line, and vd denotes an Abbe number. The same symbols are used in the subsequent embodiments. Note that the surfaces denoted by the surface numbers s0 and s1 are an object surface (a surface of a cover glass CG on the object side) and a surface of the cover glass CG on an image side, respectively. The surfaces denoted by the surface numbers s2, and s16 are a lens surface of the objective 1 closest to the object and a lens surface of the objective 1 closest to the image, respectively. In addition, the surface interval d0 denotes a distance on the optical axis from a surface indicated by the surface number s0 to a surface indicated by the surface number s1.

Provided below are refractive indices at wavelengths other than the d-line, the Abbe number at the d-line, and the partial dispersion ratio based on the h-line and the F-line for each glass material provided in the above lens data. Note that the following relationship between the glass material and these refractive indices, Abbe number and partial dispersion ratio is the same in the subsequent embodiments.
Material: h-line g-line F-line e-line d-line C-line t-line vd θhF
  404.656 435.835 486.13 546.07 587.56 656.27 1013.98
Glass 1: 1.44647 1.44444 1.44196 1.43986 1.43875 1.43733 1.43343 94.66 0.97408207
Glass 2: 1.5072 1.50451 1.50123 1.49845 1.497 1.49514 1.4901 81.54 0.98029557
Glass 3: 1.52977 1.52621 1.52191 1.51825 1.51633 1.51386 1.50686 64.14 0.97639752
Glass 4: 1.63755 1.63091 1.62311 1.61669 1.6134 1.60925 1.59841 44.27 1.04184704
Glass 5: 1.5758 1.57114 1.56553 1.56082 1.55836 1.55519 1.54625 54.01 0.99323017
Glass 6: 1.63723 1.63071 1.623 1.61664 1.61336 1.60922 1.59828 44.49 1.03265602
Glass 7: 1.66385 1.6567 1.64828 1.64132 1.63775 1.63324 1.62139 42.41 1.03523936
Glass 8: 1.54043 1.53597 1.53068 1.52626 1.52397 1.52105 1.51314 54.41 1.01246106

The objective 1 satisfies the conditional expressions (1) to (9) as provided below. Note that the first negative lens that satisfies the conditional expression (5) and the conditional expression (6) is the lens L1 and the first positive lens that satisfies the conditional expression (7) and the conditional expression (8) is the lens L2. With respect to the conditional expression (7), the objective 1 has a value close to the lower limit, and with respect to the conditional expression (8), the objective 1 has a value close to the upper limit.
(1) NA=0.4
(2) H/f=2.60
(3) a/b=0.46
(4) a/c=0.49
(5) vd(−)=44.49
(6) θhF(−)=1.0327
(7) vd(+)=81.54
(8) θhF(+)=0.9803
(9) |Δz|/DOF$_e$=4.15

FIG. 2A to FIG. 2F are diagrams of aberration of the objective 1 in FIG. 1, and illustrate aberration on an object surface when an infinite distant light flux enters from the image side. FIG. 2A is a diagram illustrating a spherical aberration, FIG. 2B is a diagram illustrating a measurement of offence against sine condition, FIG. 2C is a diagram illustrating an astigmatism, and FIG. 2D is a diagram illustrating distortion. FIG. 2E and FIG. 2F are diagrams illustrating a coma aberration at a position at which an object height ratio is 0.5 (object height 0.55 mm) and a coma aberration at a position at which an object height ratio is 1 (object height 1.1 mm), respectively. Note that in the diagrams, "M" denotes a meridional component and "S" denotes a sagittal component. The similar diagrams of aberrations are also provided in the subsequent embodiments.

Figure 17:
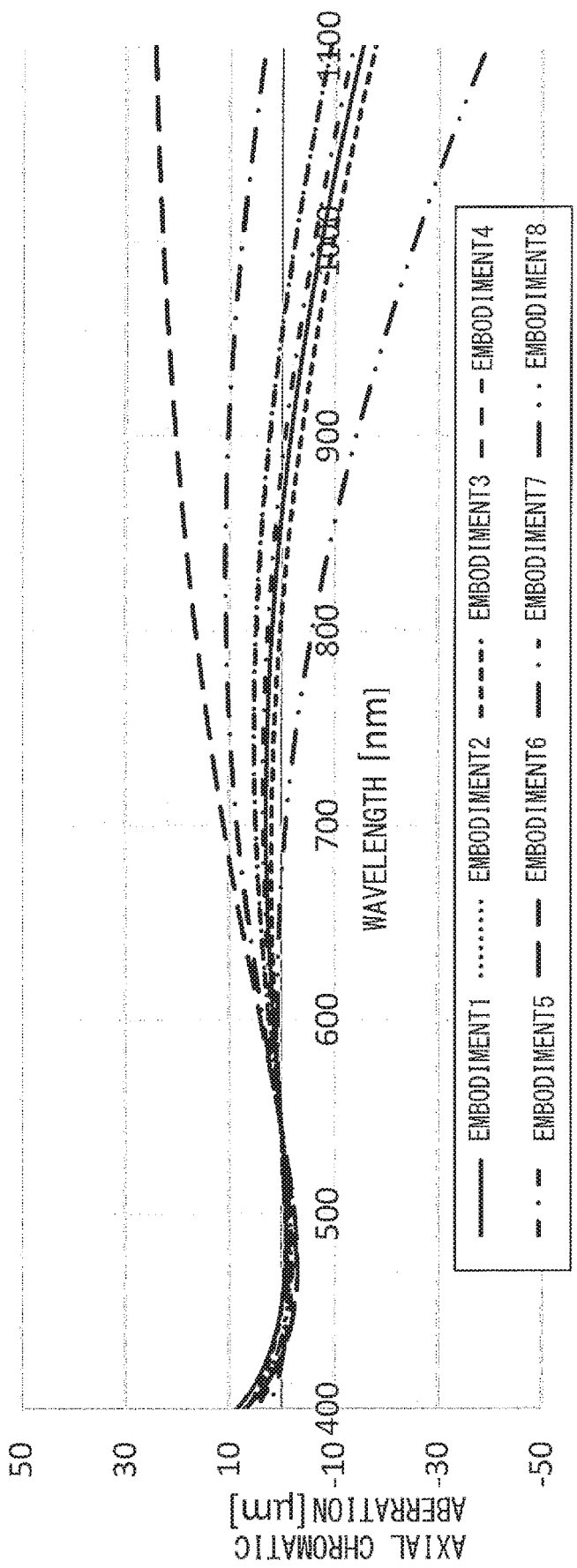
FIG. 17 is a diagram illustrating axial chromatic aberration properties of the objectives according to Embodiment 1 to Embodiment 8.

FIG. 2A to FIG. 2F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

Embodiment 2

FIG. 3 is a cross-sectional view of the objective 2 according to the present embodiment. The objective 2 includes the first lens group G1 and the second lens group G2 that are arranged in this order from the object side. Note that the objective 2 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens, and these lenses are arranged in this order from the object side. In other words, the cemented lens CL1 is a cemented doublet meniscus lens that combines a positive lens with a negative lens. Each of the lens L3 and the lens L4 is a single lens and is a biconvex lens. The cemented lens CL2 consists of a lens L5 that is a biconvex lens and a lens L6 that is a biconcave lens, and these lenses are arranged in this order from the object side. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power, and these lenses are arranged in this order from the object side.

The cemented lens CL3 consists of a lens L7 that is a biconcave lens and a lens L8 that is a biconvex lens, and these lenses are arranged in this order from the object side. In other words, the cemented lens CL3 is a cemented doublet meniscus lens that combines a positive lens with a negative lens. The lens L9 is a single lens and is a meniscus lens with a concave surface facing the object side.

Specific data of the objective 2 is provided below.
NA=0.4, f=18 mm, object height=1.1 mm, H=48.00 mm, a=0.58 mm, b=5.81 mm, c=5.81 mm, |Δz|=5.43 μm, DOF$_e$=1.70647 μm The lens data of the objective 2 is provided below. Note that INF in the lens data denotes infinity (∞).

| Objective 2 | | | | | |
|---|---|---|---|---|---|
| s | r | d | nd | vd | glass material |
| 0 | ∞ | 0.17 | 1.52397 | 54.41 | glass 8 |
| 1 | ∞ | 3.6857 | | | |
| 2 | −10.8352 | 5.8075 | 1.61336 | 44.49 | glass 6 |
| 3 | 13.1778 | 3.4892 | 1.497 | 81.54 | glass 2 |
| 4 | −12.3222 | 0.0007 | | | |
| 5 | 133.1377 | 2.8156 | 1.43875 | 94.66 | glass 1 |
| 6 | −18.0798 | 0.0001 | | | |
| 7 | 15.1824 | 4.5858 | 1.43875 | 94.66 | glass 1 |
| 8 | −18.2055 | 0.5799 | | | |
| 9 | 15.5835 | 4.8192 | 1.43875 | 94.66 | glass 1 |
| 10 | −9.6194 | 5.8075 | 1.51633 | 64.14 | glass 3 |
| 11 | 7.3204 | 5.3154 | | | |
| 12 | −4.999 | 2.9253 | 1.51633 | 64.14 | glass 3 |
| 13 | 4894.9503 | 4.1976 | 1.43875 | 94.66 | glass 1 |
| 14 | −9.51 | 0.2477 | | | |
| 15 | −80.1116 | 3.5506 | 1.43875 | 94.66 | glass 1 |
| 16 | −13.4114 | | | | |

The objective 2 satisfies the conditional expressions (1) to (9) as provided below. Note that the first negative lens that satisfies the conditional expression (5) and the conditional expression (6) is the lens L1 and the first positive lens that satisfies the conditional expression (7) and the conditional expression (8) is the lens L2. With respect to the conditional expression (3) and the conditional expression (4), the objective 2 has values close to their lower limits.
(1) NA=0.4
(2) H/f=2.67
(3) a/b=0.10
(4) a/c=0.10
(5) vd(−)=44.49
(6) θhF(−)=1.0327
(7) vd(+)=81.54
(8) θhF(+)=0.9803
(9) |Δz|/DOF$_e$=3.18

FIG. 4A to FIG. 4F are diagrams of aberration of the objective 2 in FIG. 3, and illustrate aberration on an object surface when an infinite distant light flux enters from the image side. FIG. 4A to FIG. 4F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

Embodiment 3

FIG. 5 is a cross-sectional view of the objective 3 according to the present embodiment. The objective 3 includes the first lens group G1 and the second lens group G2 that are arranged in this order from the object side. Note that the objective 3 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens, and these lenses are arranged in this order from the object side. In other words, the cemented lens CL1 is a cemented doublet meniscus lens that combines a positive lens with a negative lens. Each of the lens L3 and the lens L4 is a single lens and is a biconvex lens. The cemented lens CL2 consists of a lens L5 that is a biconvex lens and a lens L6 that is a biconcave lens, and these lenses are arranged in this order from the object side. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power, and these lenses are arranged in this order from the object side.

The cemented lens CL3 consists of a lens L7 that is a biconcave lens and a lens L8 that is a biconvex lens, and these lenses are arranged in this order from the object side. In other words, the cemented lens CL3 is a cemented doublet meniscus lens that combines a positive lens with a negative lens. The lens L9 is a single lens and is a meniscus lens with a concave surface facing the object side.

Specific data of the objective 3 is provided below.
NA=0.4, f=18 mm, object height=1.1 mm, H=49.13 mm, a=5.07 mm, b=4.23 mm, c=4.23 mm, |Δz|=5.88 μm, $DOF_e$=1.70647 μm The lens data of the objective 3 is provided below. Note that INF in the lens data denotes infinity (∞).

| Objective 3 | | | | | |
|---|---|---|---|---|---|
| s | r | d | nd | vd | glass material |
| 0 | ∞ | 0.17 | 1.52397 | 54.41 | glass 8 |
| 1 | ∞ | 3.0308 | | | |
| 2 | −10.4635 | 4.2268 | 1.61336 | 44.49 | glass 6 |
| 3 | 10.1112 | 3.1063 | 1.497 | 81.54 | glass 2 |
| 4 | −8.5666 | 3.11 | | | |
| 5 | 43.1423 | 2.8123 | 1.43875 | 94.66 | glass 1 |
| 6 | −24.9974 | 0.1932 | | | |
| 7 | 17.8381 | 4.2671 | 1.43875 | 94.66 | glass 1 |
| 8 | −16.6386 | 1.7691 | | | |
| 9 | 19.4509 | 4.2866 | 1.43875 | 94.66 | glass 1 |
| 10 | −8.5084 | 4.2268 | 1.51633 | 64.14 | glass 3 |
| 11 | 8.2867 | 7.1231 | | | |
| 12 | −6.0876 | 3.281 | 1.51633 | 64.14 | glass 3 |
| 13 | 276.1137 | 3.9573 | 1.43875 | 94.66 | glass 1 |
| 14 | −11.157 | 0.1757 | | | |
| 15 | −110.8752 | 3.3935 | 1.43875 | 94.66 | glass 1 |
| 16 | −14.4571 | | | | |

The objective 3 satisfies the conditional expressions (1) to (9) as provided below. Note that the first negative lens that satisfies the conditional expression (5) and the conditional expression (6) is the lens L1 and the first positive lens that satisfies the conditional expression (7) and the conditional expression (8) is the lens L2. With respect to the conditional expression (3) and the conditional expression (4), the objective 3 has values close to their upper limits.
(1) NA=0.4
(2) H/f=2.73
(3) a/b=1.20
(4) a/c=1.20
(5) vd(−)=44.49
(6) θhF(−)=1.0327
(7) vd(+)=81.54
(8) θhF(+)=0.9803
(9) |Δz|/$DOF_e$=3.45

FIG. 6A to FIG. 6F are diagrams of aberration of the objective 3 in FIG. 5, and illustrate aberration on an object surface when an infinite distant light flux enters from the image side. FIG. 6A to FIG. 6F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

Embodiment 4

Figure 7:
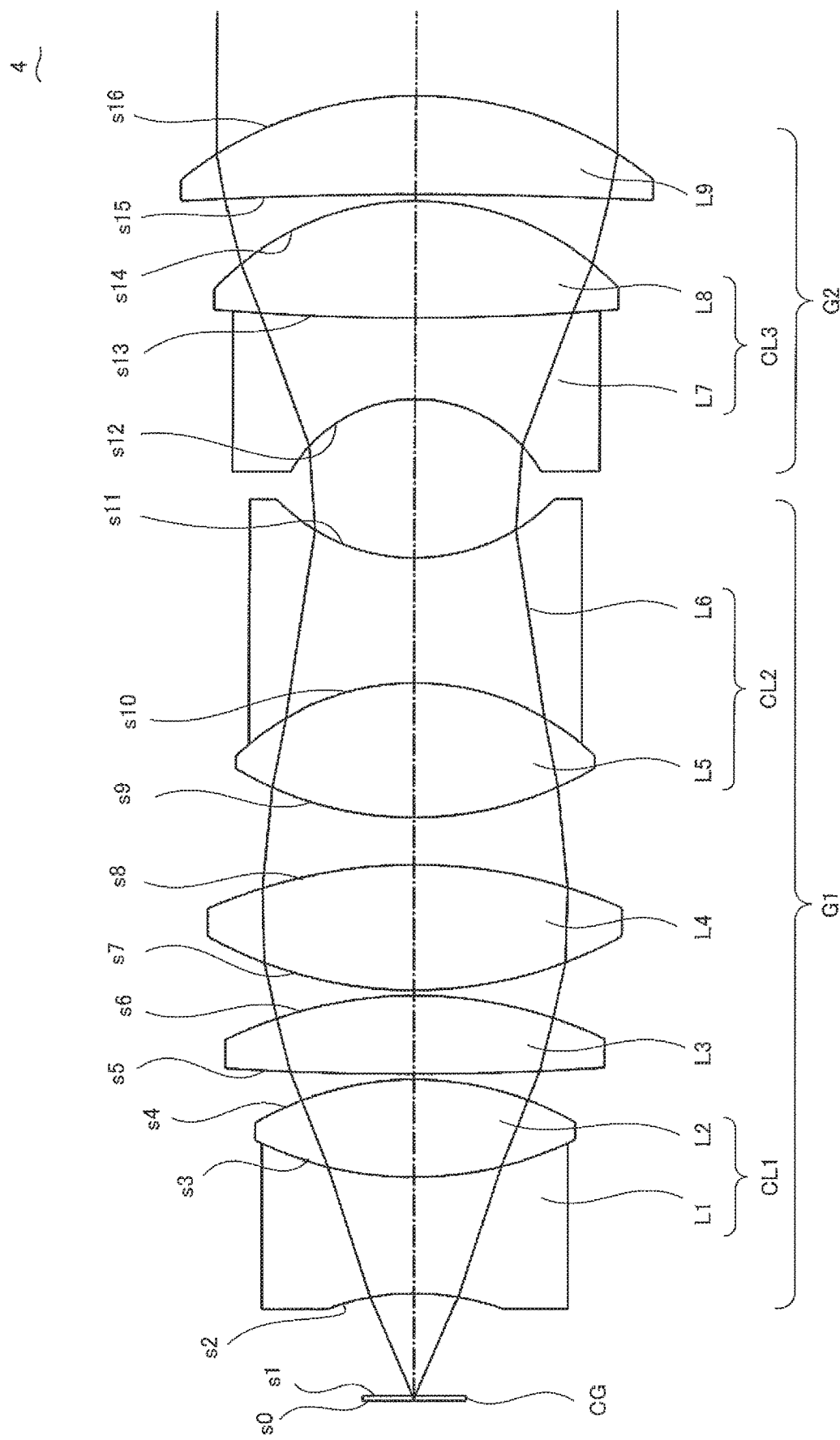
FIG. 7 is a cross-sectional view of the objective 4 according to Embodiment 4 of the present invention.
Figure 8:
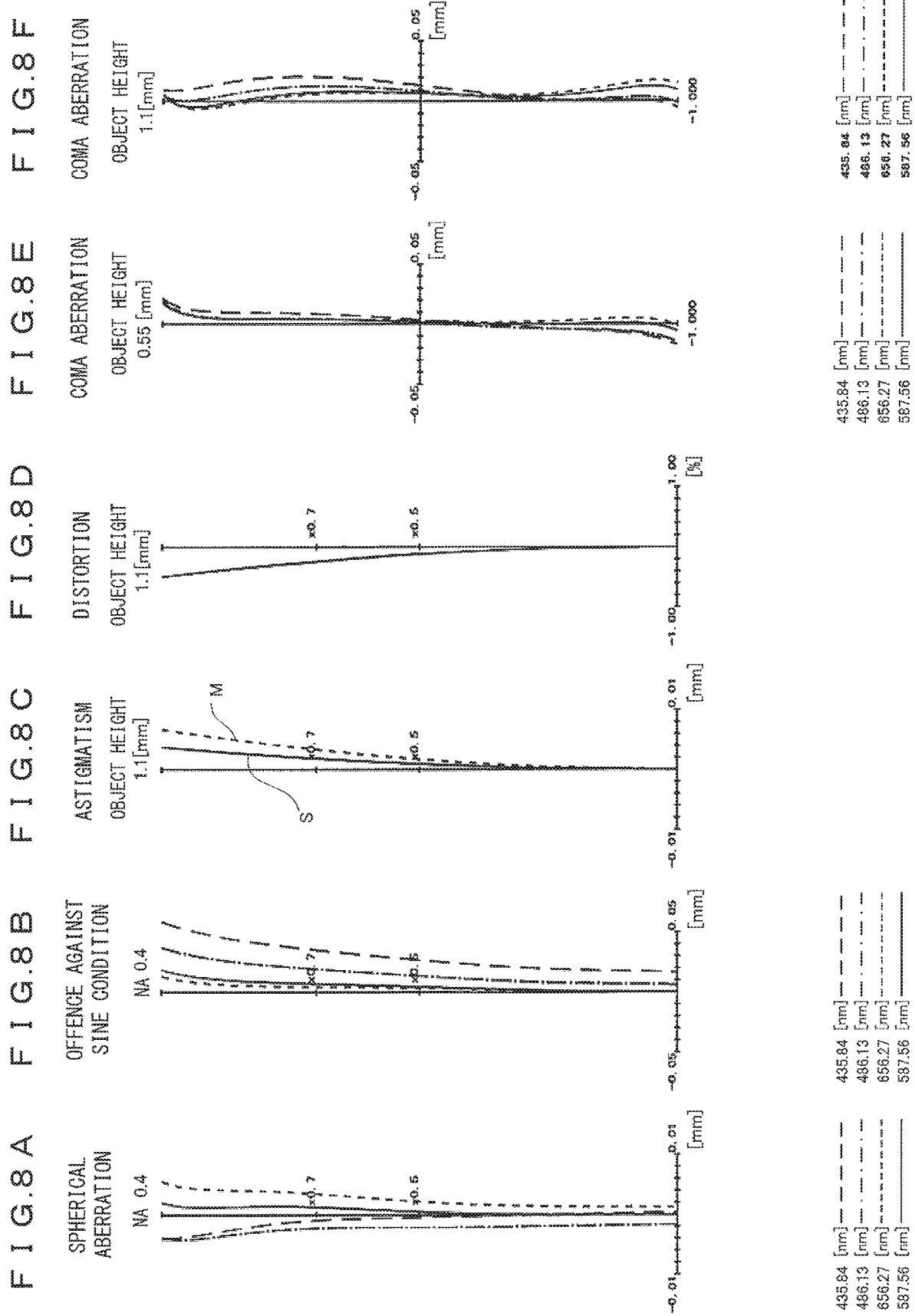
FIG. 8A to FIG. 8F are diagrams of aberrations of the objective 4 in FIG. 7.

FIG. 7 is a cross-sectional view of the objective 4 according to the present embodiment. The objective 4 includes the first lens group G1 and the second lens group G2 that are arranged in this order from the object side. Note that the objective 4 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens, and these lenses are arranged in this order from the object side. In other words, the cemented lens CL1 is a cemented doublet meniscus lens that combines a positive lens with a negative lens. Each of the lens L3 and the lens L4 is a single lens and is a biconvex lens. The cemented lens CL2 consists of a lens L5 that is a biconvex lens and a lens L6 that is a biconcave lens, and these lenses are arranged in this order from the object side. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power, and these lenses are arranged in this order from the object side.

The cemented lens CL3 consists of a lens L7 that is a biconcave lens and a lens L8 that is a biconvex lens, and these lenses are arranged in this order from the object side. In other words, the cemented lens CL3 is a cemented doublet meniscus lens that combines a positive lens with a negative lens. The lens L9 is a single lens and is a meniscus lens with a concave surface facing the object side.

Specific data of the objective 4 is provided below.
NA=0.4, f=18 mm, object height=1.1 mm, H=46.71 mm, a=2.08 mm, b=4.49 mm, c=4.17 mm, |Δz|=3.92 μm, $DOF_e$=1.70647 μm The lens data of the objective 4 is provided below. Note that INF in the lens data denotes infinity (∞).

| Objective 4 | | | | | |
|---|---|---|---|---|---|
| s | r | d | nd | vd | glass material |
| 0 | ∞ | 0.17 | 1.52397 | 54.41 | glass 8 |
| 1 | ∞ | 3.6607 | | | |
| 2 | −9.2228 | 4.1728 | 1.63775 | 42.41 | glass 7 |
| 3 | 13.2284 | 3.4864 | 1.497 | 81.54 | glass 2 |
| 4 | −11.5383 | 0.2021 | | | |
| 5 | 107.4935 | 2.8107 | 1.43875 | 94.66 | glass 1 |
| 6 | −15.6301 | 0.193 | | | |
| 7 | 15.2675 | 4.4859 | 1.43875 | 94.66 | glass 1 |
| 8 | −18.5509 | 1.6895 | | | |

-continued

| Objective 4 | | | | | |
|---|---|---|---|---|---|
| s | r | d | nd | vd | glass material |
| 9 | 12.6359 | 4.8135 | 1.43875 | 94.66 | glass 1 |
| 10 | −9.318 | 4.4906 | 1.51633 | 64.14 | glass 3 |
| 11 | 6.9847 | 5.6758 | | | |
| 12 | −5.1999 | 2.9098 | 1.51633 | 64.14 | glass 3 |
| 13 | 87.2733 | 4.1801 | 1.43875 | 94.66 | glass 1 |
| 14 | −10.0404 | 0.2339 | | | |
| 15 | −158.3129 | 3.5384 | 1.43875 | 94.66 | glass 1 |
| 16 | −13.5017 | | | | |

The objective 4 satisfies the conditional expressions (1) to (9) as provided below. Note that the first negative lens that satisfies the conditional expression (5) and the conditional expression (6) is the lens L1 and the first positive lens that satisfies the conditional expression (7) and the conditional expression (8) is the lens L2. With respect to the conditional expression (5), the objective 4 has a value close to the lower limit and with respect to the conditional expression (6), the objective 4 has a value close to the upper limit.
(1) NA=0.4
(2) H/f=2.60
(3) a/b=0.46
(4) a/c=0.50
(5) vd(−)=42.41
(6) θhF(−)=1.0352
(7) vd(+)=81.54
(8) θhF(+)=0.9803
(9) $|\Delta z|/DOF_e$=2.30

FIG. 8A to FIG. 8F are diagrams of aberration of the objective 4 in FIG. 7, and illustrate aberration on an object surface when an infinite distant light flux enters from the image side. FIG. 8A to FIG. 8F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

Embodiment 5

Figure 9:
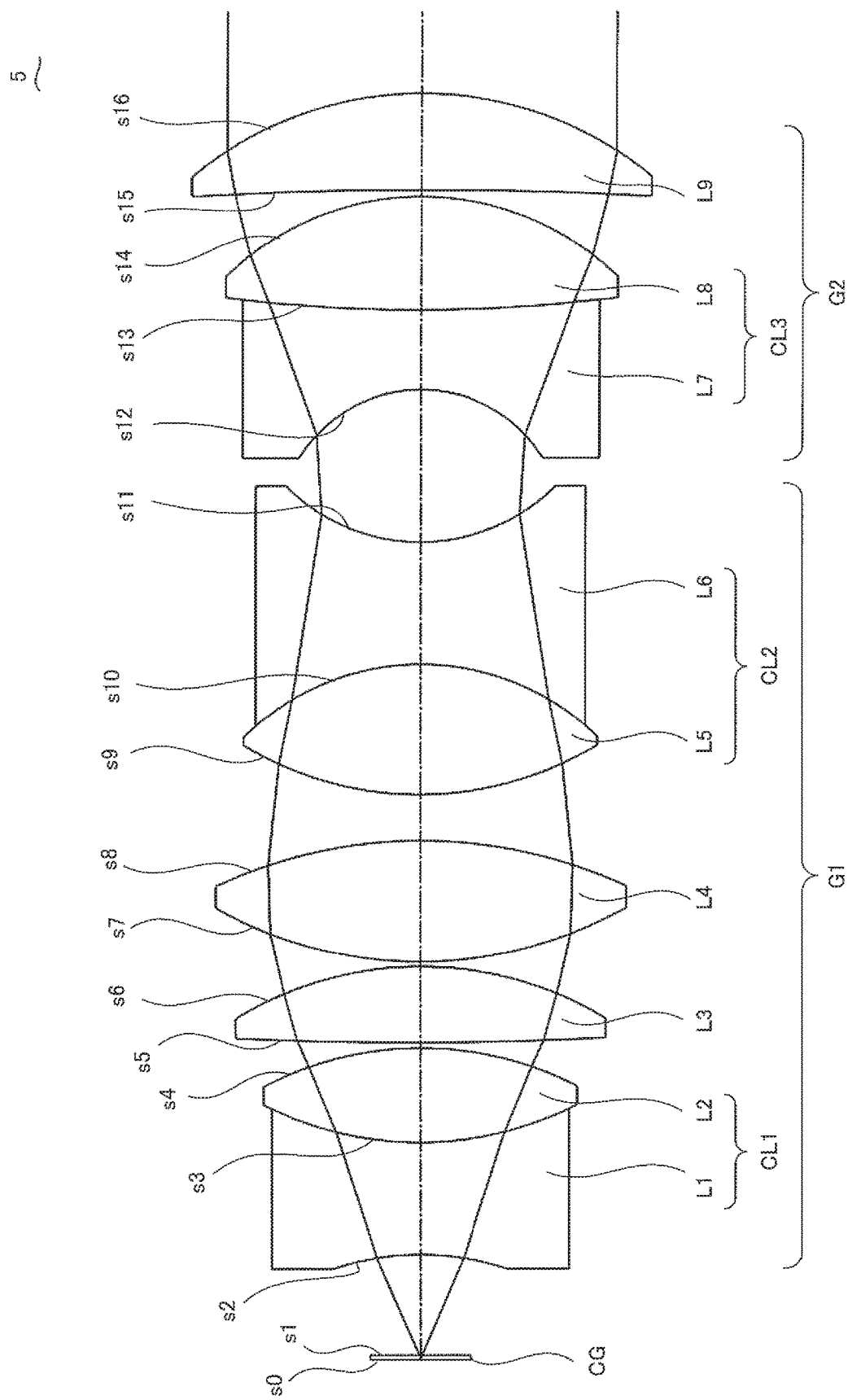
FIG. 9 is a cross-sectional view of the objective 5 according to Embodiment 5 of the present invention.
Figure 10:
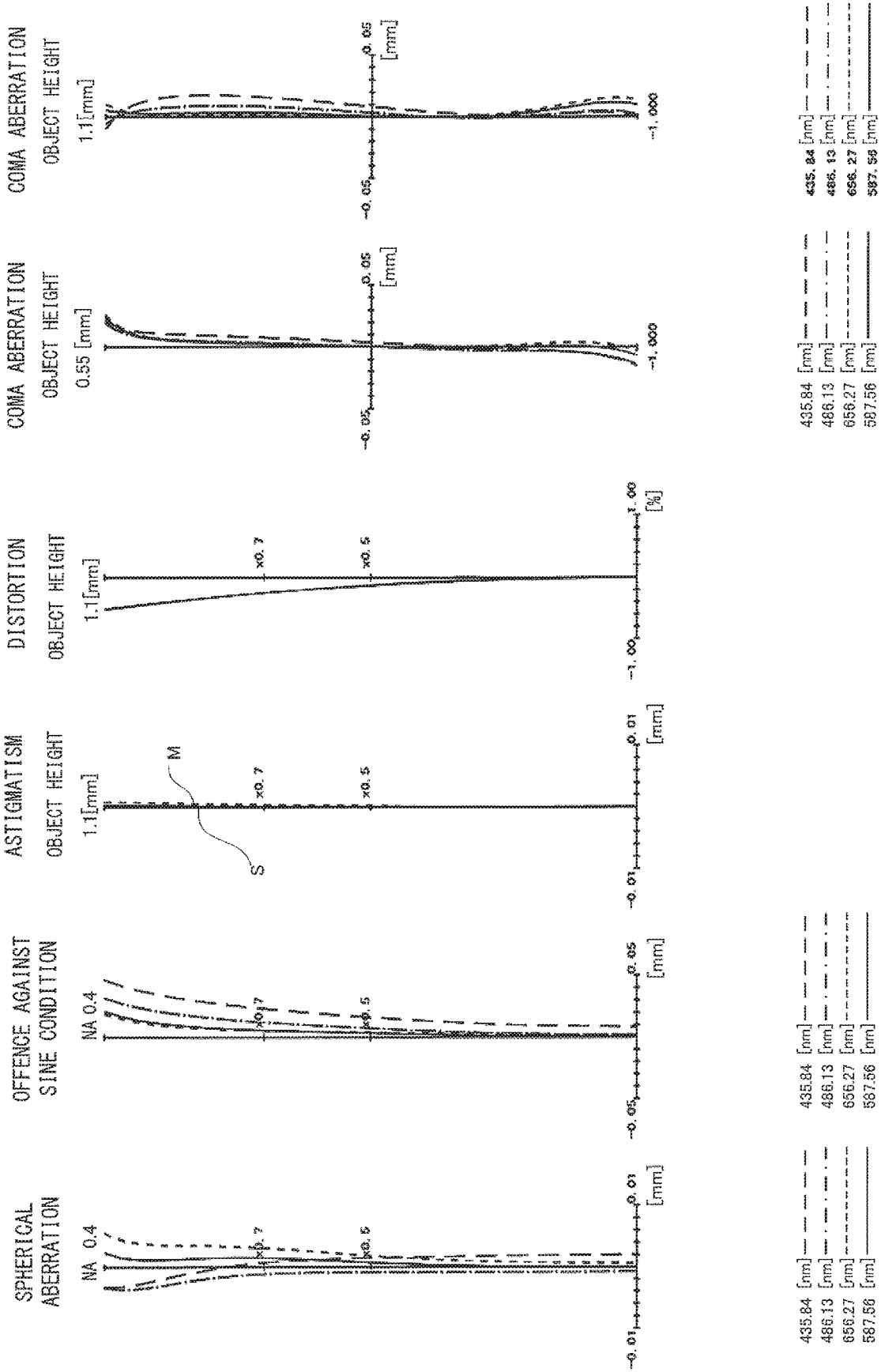
FIG. 10A to FIG. 10F are diagrams of aberrations of the objective 5 in FIG. 9.

FIG. 9 is a cross-sectional view of the objective 5 according to the present embodiment. The objective 5 includes the first lens group G1 and the second lens group G2 that are arranged in this order from the object side. Note that the objective 5 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens, and these lenses are arranged in this order from the object side. In other words, the cemented lens CL1 is a cemented doublet meniscus lens that combines a positive lens with a negative lens. Each of the lens L3 and the lens L4 is a single lens and is a biconvex lens. The cemented lens CL2 consists of a lens L5 that is a biconvex lens and a lens L6 that is a biconcave lens, and these lenses are arranged in this order from the object side. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power, and these lenses are arranged in this order from the object side.

The cemented lens CL3 consists of a lens L7 that is a biconcave lens and a lens L8 that is a biconvex lens, and these lenses are arranged in this order from the object side. In other words, the cemented lens CL3 is a cemented doublet meniscus lens that combines a positive lens with a negative lens. The lens L9 is a single lens and is a meniscus lens with a concave surface facing the object side.

Specific data of the objective 5 is provided below.
NA=0.4, f=18 mm, object height=1.1 mm, H=46.69 mm, a=2.06 mm, b=4.49 mm, c=4.14 mm, $|\Delta z|$=4.82 μm, $DOF_e$=1.70647 μm The lens data of the objective 5 is provided below. Note that INF in the lens data denotes infinity (∞).

| Objective 5 | | | | | |
|---|---|---|---|---|---|
| s | r | d | nd | vd | glass material |
| 0 | ∞ | 0.17 | 1.52397 | 54.41 | glass 8 |
| 1 | ∞ | 3.7134 | | | |
| 2 | −10.0734 | 4.1434 | 1.61336 | 44.49 | glass 6 |
| 3 | 12.8014 | 3.4815 | 1.43875 | 94.66 | glass 1 |
| 4 | −12.5828 | 0.1967 | | | |
| 5 | 140.679 | 2.8056 | 1.43875 | 94.66 | glass 1 |
| 6 | −13.1885 | 0.1753 | | | |
| 7 | 15.4487 | 4.4714 | 1.43875 | 94.66 | glass 1 |
| 8 | −17.9913 | 1.6907 | | | |
| 9 | 12.6425 | 4.8153 | 1.43875 | 94.66 | glass 1 |
| 10 | −9.3243 | 4.4936 | 1.51633 | 64.14 | glass 3 |
| 11 | 7.0784 | 5.6266 | | | |
| 12 | −5.2899 | 2.9219 | 1.51633 | 64.14 | glass 3 |
| 13 | 57.3403 | 4.1912 | 1.43875 | 94.66 | glass 1 |
| 14 | −10.3743 | 0.2455 | | | |
| 15 | −150.4251 | 3.5499 | 1.43875 | 94.66 | glass 1 |
| 16 | −13.3555 | | | | |

The objective 5 satisfies the conditional expressions (1) to (9) as provided below. Note that the first negative lens that satisfies the conditional expression (5) and the conditional expression (6) is the lens L1 and the first positive lens that satisfies the conditional expression (7) and the conditional expression (8) is the lens L2. With respect to the conditional expression (7), the objective 5 has a value close to the upper limit and with respect to the conditional expression (8), the objective 5 has a value close to the upper limit.
(1) NA=0.4
(2) H/f=2.59
(3) a/b=0.46
(4) a/c=0.50
(5) vd(−)=44.49
(6) θhF(−)=1.0327
(7) vd(+)=94.66
(8) θhF(+)=0.9741
(9) $|\Delta z|/DOF_e$=2.82

FIG. 10A to FIG. 10F are diagrams of aberration of the objective 5 in FIG. 9, and illustrate aberration on an object surface when an infinite distant light flux enters from the image side. FIG. 10A to FIG. 10F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

Embodiment 6

Figure 11:
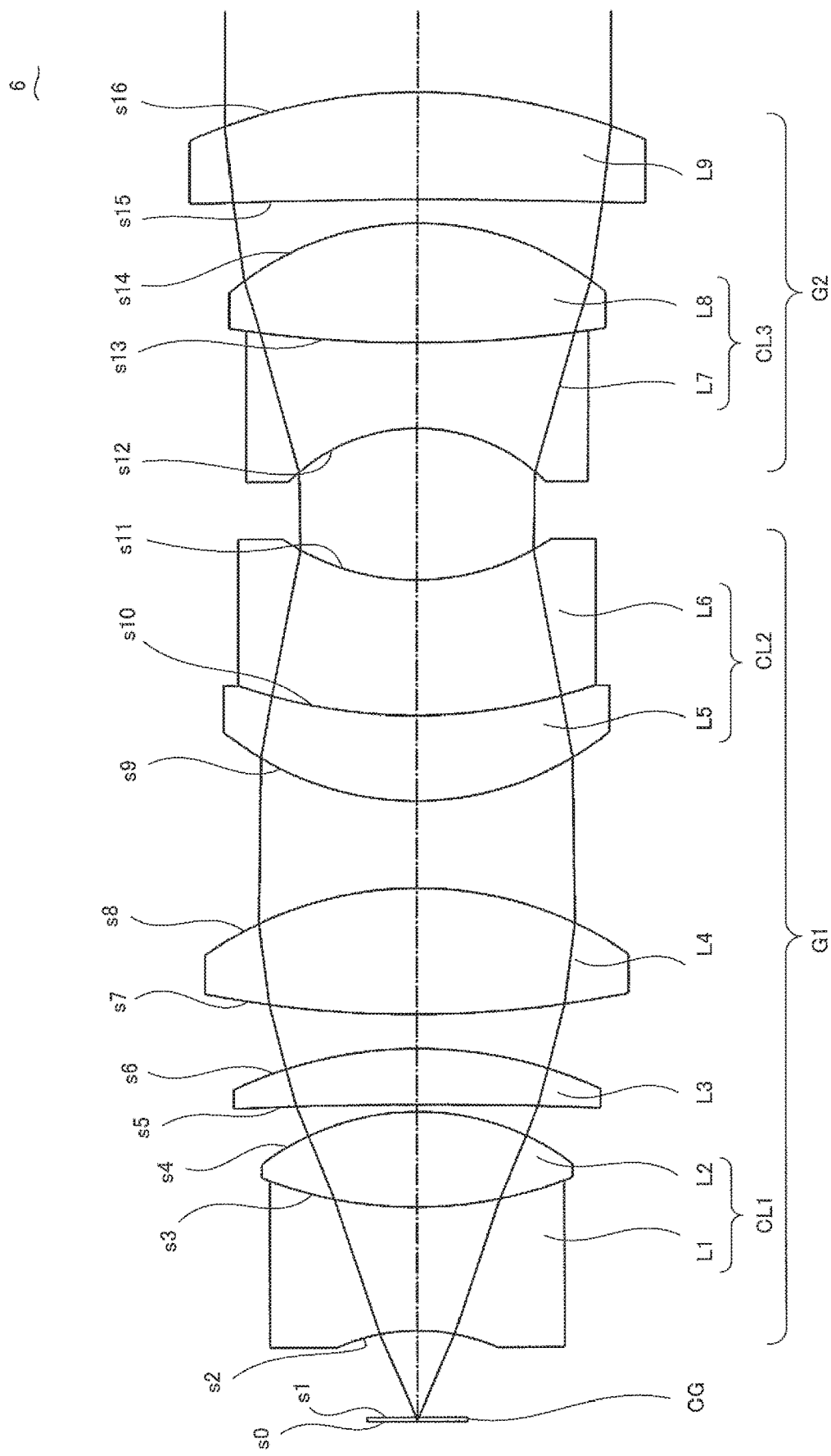
FIG. 11 is a cross-sectional view of the objective 6 according to Embodiment 6 of the present invention.
Figure 12:
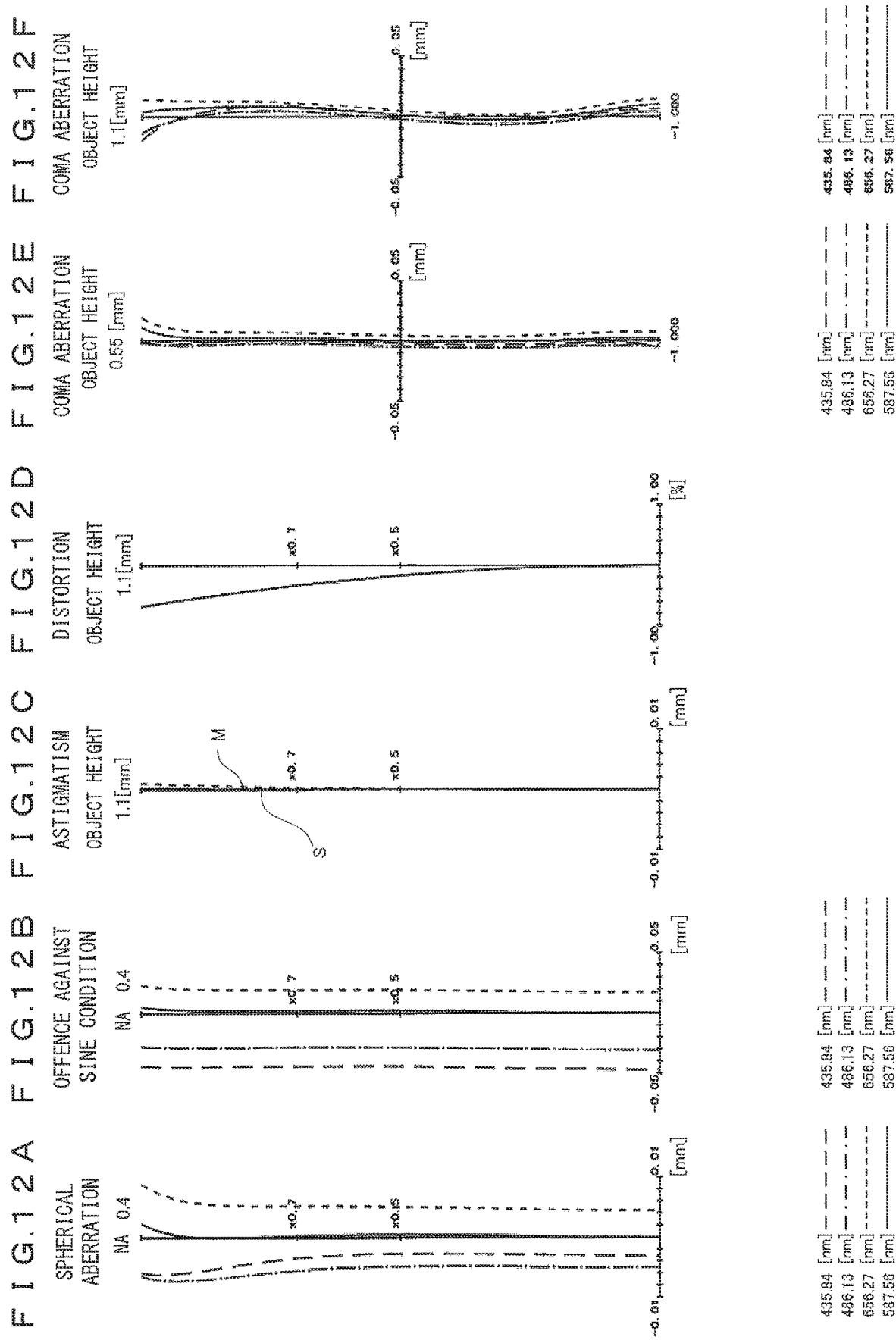
FIG. 12A to FIG. 12F are diagrams of aberrations of the objective 6 in FIG. 11.
Figure 14:
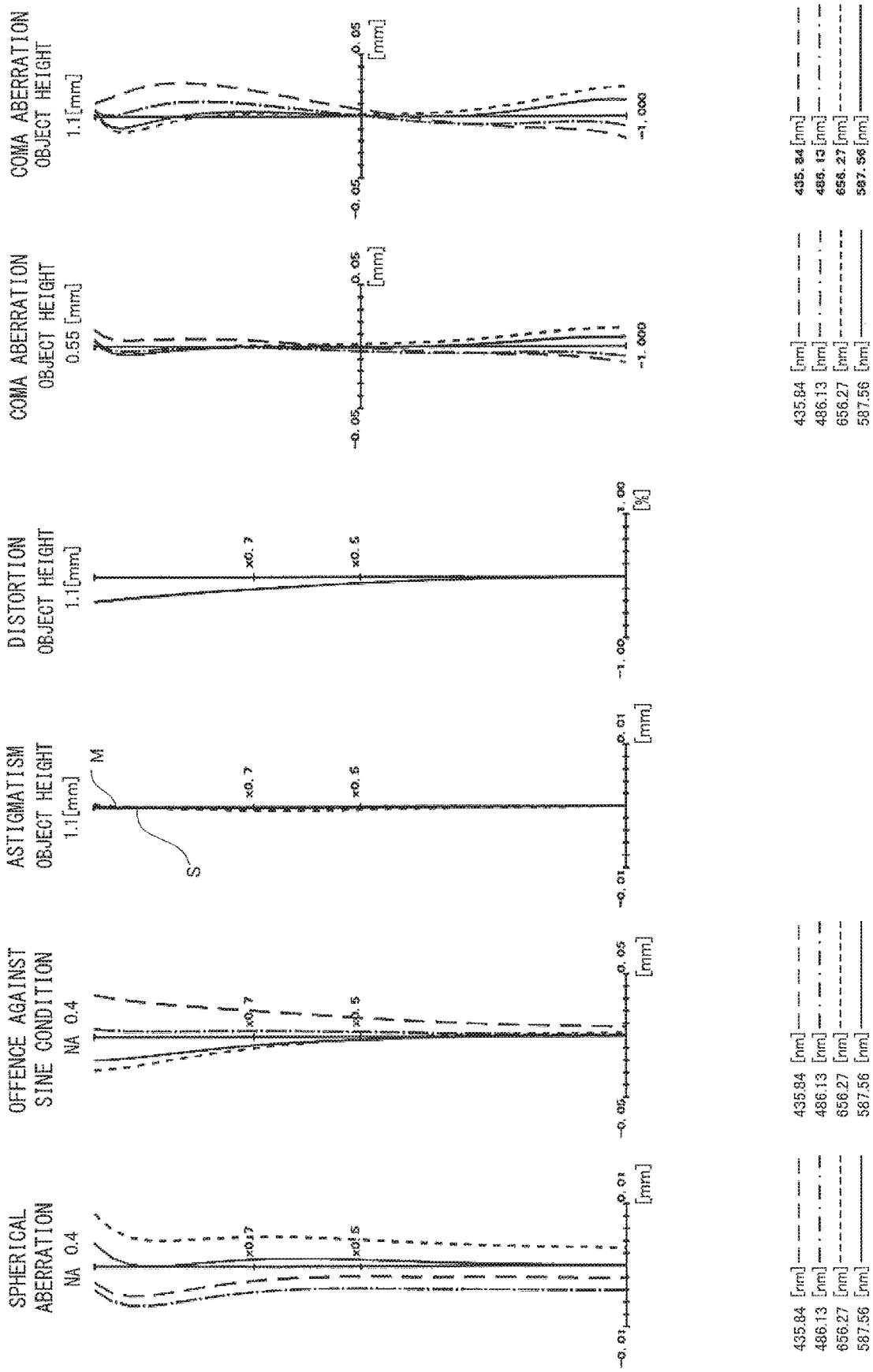
FIG. 14A to FIG. 14F are diagrams of aberrations of the objective 7 in FIG. 13.

FIG. 11 is a cross-sectional view of the objective 6 according to the present embodiment. The objective 6 includes the first lens group G1 and the second lens group G2 that are arranged in this order from the object side. Note that the objective 6 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens, and these lenses are arranged in this order from the object side. In other words, the cemented lens CL1 is a cemented doublet meniscus lens that combines a positive lens with a negative lens. Each of the lens L3 and the lens L4 is a single lens. The lens L3 is a meniscus lens with a concave surface facing the object side and has a positive refractive power. The lens L4 is a biconvex lens. The cemented lens CL2 consists of a lens L5 that is a meniscus lens with a concave surface facing the image side and a lens L6 that is a meniscus lens with the concave surface facing the image side, and these lenses are arranged in this order from the object side. The lens L5 is a positive lens and the lens L6 is a negative lens. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power, and these lenses are arranged in this order from the object side.

The cemented lens CL3 consists of a lens L7 that is a biconcave lens and a lens L8 that is a biconvex lens, and these lenses are arranged in this order from the object side. In other words, the cemented lens CL3 is a cemented doublet meniscus lens that combines a positive lens with a negative lens. The lens L9 is a single lens and is a meniscus lens with a concave surface facing the object side.

Specific data of the objective 6 is provided below.
NA=0.4, f=18 mm, object height=1.1 mm, H=49.35 mm, a=4.78 mm, b=5.03 mm, c=4.60 mm, |Δz|=5.52 μm, $DOF_e$=1.70647 μm The lens data of the objective 6 is provided below. Note that INF in the lens data denotes infinity (∞).

| Objective 6 | | | | | |
|---|---|---|---|---|---|
| s | r | d | nd | vd | glass material |
| 0 | ∞ | 0.17 | 1.52397 | 54.41 | glass 8 |
| 1 | ∞ | 3.2111 | | | |
| 2 | −7.4557 | 4.6001 | 1.6134 | 44.27 | glass 4 |
| 3 | 15.9876 | 3.535 | 1.43875 | 94.66 | glass 1 |
| 4 | −9.5985 | 0.2659 | | | |
| 5 | −162.6052 | 2.0818 | 1.43875 | 94.66 | glass 1 |
| 6 | −16.2391 | 1.2675 | | | |
| 7 | 40.5827 | 4.6858 | 1.43875 | 94.66 | glass 1 |
| 8 | −13.9039 | 3.2449 | | | |
| 9 | 11.3777 | 3.1612 | 1.43875 | 94.66 | glass 1 |
| 10 | 20.5437 | 5.0342 | 1.63775 | 42.41 | glass 7 |
| 11 | 9.024 | 5.6166 | | | |
| 12 | −6.796 | 3.1779 | 1.51633 | 64.14 | glass 3 |
| 13 | 46.0411 | 4.4284 | 1.43875 | 94.66 | glass 1 |
| 14 | −10.9548 | 0.874 | | | |
| 15 | −229.4554 | 3.9959 | 1.43875 | 94.66 | glass 1 |
| 16 | −21.183 | | | | |

The objective 6 satisfies the conditional expressions (1) to (9) as provided below. Note that the first negative lens that satisfies the conditional expression (5) and the conditional expression (6) is the lens L6 and the first positive lens that satisfies the conditional expression (7) and the conditional expression (8) is the lens L5.

(1) NA=0.4
(2) H/f=2.74
(3) a/b=0.95
(4) a/c=1.04
(5) vd(−)=42.41
(6) θhF(−)=1.0352
(7) vd(+)=94.66
(8) θhF(+)=0.9741
(9) |Δz|/$DOF_e$=3.23

FIG. 12A to FIG. 12F are diagrams of aberration of the objective 6 in FIG. 11, and illustrate aberration on an object surface when an infinite distant light flux enters from the image side. FIG. 12A to FIG. 12F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

Embodiment 7

FIG. 13 is a cross-sectional view of the objective 7 according to the present embodiment. The objective 7 includes the first lens group G1 and the second lens group G2 that are arranged in this order from the object side. Note that the objective 7 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens, and these lenses are arranged in this order from the object side. In other words, the cemented lens CL1 is a cemented doublet meniscus lens that combines a positive lens with a negative lens. Each of the lens L3 and the lens L4 is a single lens. The lens L3 is a meniscus lens with a concave surface facing the object side and has a positive refractive power. The lens L4 is a biconvex lens. The cemented lens CL2 consists of a lens L5 that is a biconvex lens and a lens L6 that is a biconcave lens, and these lenses are arranged in this order from the object side. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power, and these lenses are arranged in this order from the object side.

The cemented lens CL3 consists of a lens L7 that is a meniscus lens with a concave surface facing the object side and a lens L8 that is a meniscus lens with a concave surface facing the object side, and these lenses are arranged in this order from the object side. The lens L7 is a negative lens and the lens L8 is a positive lens. In other words, the cemented lens CL3 is a cemented doublet meniscus lens that combines a positive lens with a negative lens. The lens L9 is a single lens and is a meniscus lens with a concave surface facing the object side.

Specific data of the objective 7 is provided below.
NA=0.4, f=18 mm, object height=1.1 mm, H=50.64 mm, a=2.20 mm, b=4.61 mm, c=4.41 mm, |Δz|=5.19 μm, $DOF_e$=1.70647 μm The lens data of the objective 7 is provided below. Note that INF in the lens data denotes infinity (∞).

| Objective 7 | | | | | |
|---|---|---|---|---|---|
| s | r | d | nd | vd | glass material |
| 0 | ∞ | 0.17 | 1.52397 | 54.41 | glass 8 |
| 1 | ∞ | 3.894 | | | |
| 2 | −10.3274 | 4.4081 | 1.6134 | 44.27 | glass 4 |
| 3 | 12.5821 | 3.6806 | 1.43875 | 94.66 | glass 1 |
| 4 | −12.9556 | 0.3242 | | | |
| 5 | −97.8095 | 2.9343 | 1.43875 | 94.66 | glass 1 |
| 6 | −12.6676 | 0.1918 | | | |
| 7 | 14.8109 | 4.8825 | 1.43875 | 94.66 | glass 1 |
| 8 | −20.7356 | 1.6854 | | | |
| 9 | 11.9302 | 4.8816 | 1.43875 | 94.66 | glass 1 |
| 10 | −10.249 | 4.608 | 1.51633 | 64.14 | glass 3 |
| 11 | 7.5244 | 7.786 | | | |
| 12 | −5.6757 | 2.9663 | 1.55836 | 54.01 | glass 5 |
| 13 | −16.8587 | 4.2391 | 1.43875 | 94.66 | glass 1 |
| 14 | −9.9631 | 0.3159 | | | |
| 15 | −139.4376 | 3.6715 | 1.43875 | 94.66 | glass 1 |
| 16 | −17.5338 | | | | |

The objective 7 satisfies the conditional expressions (1) to (9) as provided below. Note that the first negative lens that satisfies the conditional expression (5) and the conditional expression (6) is the lens L7 and the first positive lens that satisfies the conditional expression (7) and the conditional expression (8) is the lens L8.

(1) NA=0.4
(2) H/f=2.81
(3) a/b=0.48
(4) a/c=0.50
(5) vd(−)=54.01
(6) θhF(−)=0.9932
(7) vd(+)=94.66
(8) θhF(+)=0.9741
(9) |Δz|/DOF$_e$=3.04

FIG. 14A to FIG. 14F are diagrams of aberration of the objective 7 in FIG. 13, and illustrate aberration on an object surface when an infinite distant light flux enters from the image side. FIG. 14A to FIG. 14F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

Embodiment 8

Figure 15:
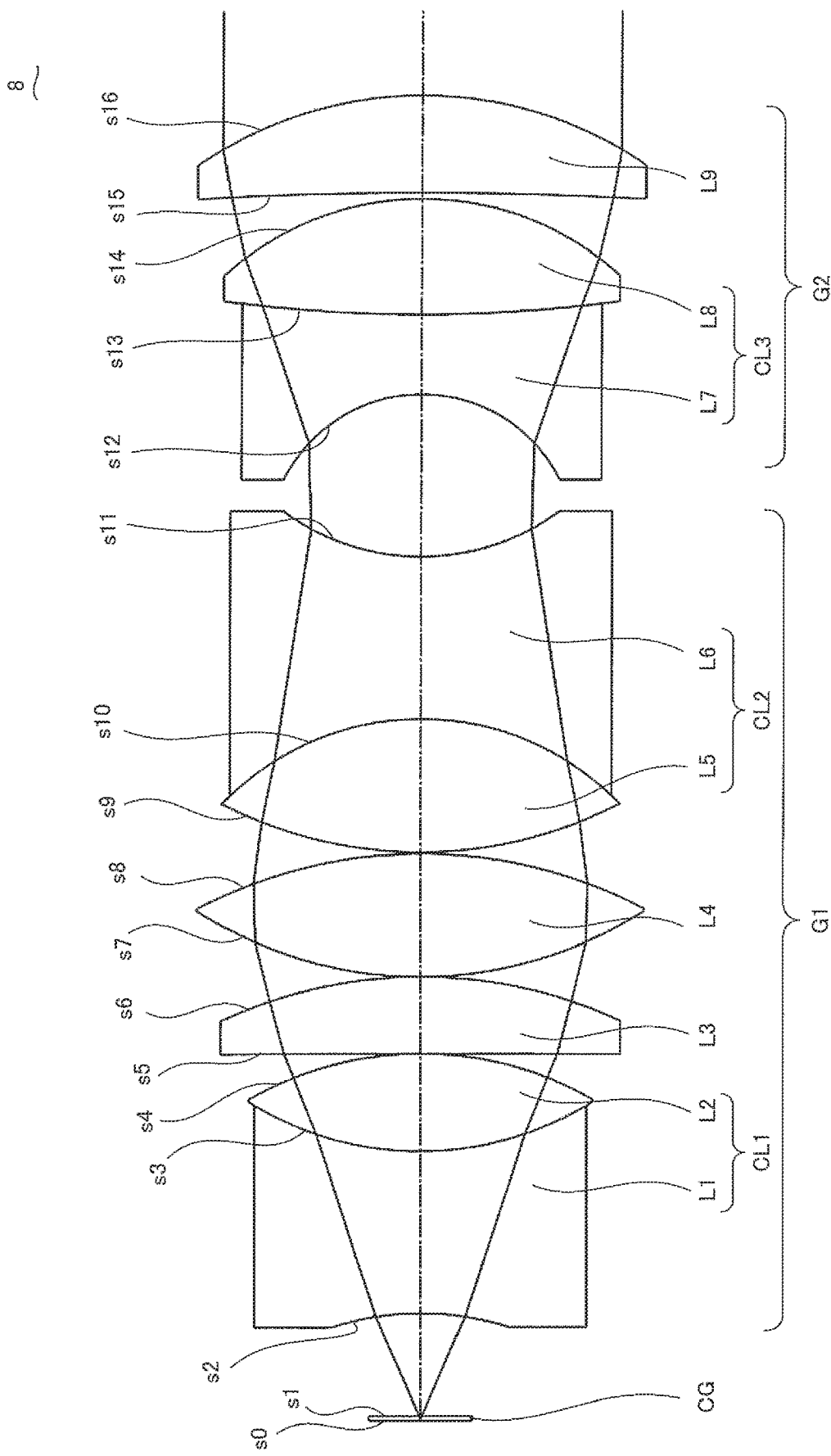
FIG. 15 is a cross-sectional view of the objective 8 according to Embodiment 8 of the present invention.

FIG. 15 is a cross-sectional view of the objective 8 according to the present embodiment. The objective 8 includes the first lens group G1 and the second lens group G2 that are arranged in this order from the object side. Note that the objective 8 is a dry microscope objective.

The first lens group G1 includes a cemented lens CL1 with a concave surface facing the object side, a lens L3 having a positive refractive power, a lens L4 having a positive refractive power, and a cemented lens CL2 with a concave surface facing the image side, and these lenses are arranged in this order from the object side.

The cemented lens CL1 consists of a lens L1 that is a biconcave lens and a lens L2 that is a biconvex lens, and these lenses are arranged in this order from the object side. In other words, the cemented lens CL1 is a cemented doublet meniscus lens that combines a positive lens with a negative lens. Each of the lens L3 and the lens L4 is a single lens. The lens L3 is a meniscus lens with a concave surface facing the object side and has a positive refractive power. The lens L4 is a biconvex lens. The cemented lens CL2 consists of a lens L5 that is a biconvex lens and a lens L6 that is a biconcave lens, and these lenses are arranged in this order from the object side. In other words, the cemented lens CL2 is a cemented doublet meniscus lens that combines a positive lens with a negative lens.

The second lens group G2 includes a cemented lens CL3 with a concave surface facing the object side and a lens L9 having a positive refractive power, and these lenses are arranged in this order from the object side.

The cemented lens CL3 consists of a lens L7 that is a biconcave lens and a lens L8 that is a biconvex lens, and these lenses are arranged in this order from the object side. In other words, the cemented lens CL3 is a cemented doublet meniscus lens that combines a positive lens with a negative lens. The lens L9 is a single lens and is a meniscus lens with a concave surface facing the object side.

Specific data of the objective 8 is provided below.
NA=0.4, f=18 mm, object height=1.1 mm, H=47.65 mm, a=0.06 mm, b=5.83 mm, c=5.83 mm, |Δz|=1.83 μm, DOF$_e$=1.70647 μm The lens data of the objective 8 is provided below. Note that INF in the lens data denotes infinity (∞).

| Objective 8 | | | | | |
|---|---|---|---|---|---|
| s | r | d | nd | vd | glass material |
| 0 | ∞ | 0.17 | 1.52397 | 54.41 | glass 8 |
| 1 | ∞ | 3.6982 | | | |
| 2 | −10.3542 | 5.8285 | 1.55836 | 54.01 | glass 5 |
| 3 | 11.7905 | 3.5178 | 1.43875 | 94.66 | glass 1 |
| 4 | −12.494 | 0.0001 | | | |
| 5 | −837.7759 | 2.7668 | 1.43875 | 94.66 | glass 1 |
| 6 | −17.1406 | 0.0001 | | | |
| 7 | 15.0797 | 4.4162 | 1.43875 | 94.66 | glass 1 |
| 8 | −17.4232 | 0.0581 | | | |
| 9 | 15.7239 | 4.8008 | 1.43875 | 94.66 | glass 1 |
| 10 | −9.9671 | 5.8284 | 1.51633 | 64.14 | glass 3 |
| 11 | 8.4458 | 5.8224 | | | |
| 12 | −5.5953 | 2.8725 | 1.51633 | 64.14 | glass 3 |
| 13 | 54.2094 | 4.1471 | 1.43875 | 94.66 | glass 1 |
| 14 | −10.712 | 0.215 | | | |
| 15 | −144.4003 | 3.5105 | 1.43875 | 94.66 | glass 1 |
| 16 | −14.2837 | | | | |

The objective 8 satisfies the conditional expressions (1) to (9) as provided below. Note that the first negative lens that satisfies the conditional expression (5) and the conditional expression (6) is the lens L1 and the first positive lens that satisfies the conditional expression (7) and the conditional expression (8) is the lens L2. With respect to the conditional expression (5), the objective 8 has a value close to the upper value, and with respect to the conditional expression (6), the objective 8 has a value close to the upper value.

(1) NA=0.4
(2) H/f=2.65
(3) a/b=0.01
(4) a/c=0.01
(5) vd(−)=54.01
(6) θhF(−)=0.9932
(7) vd(+)=94.66
(8) θhF(+)=0.9741
(9) |Δz|/DOF$_e$=1.07

FIG. 16A to FIG. 16F are diagrams of aberration of the objective 8 in FIG. 15, and illustrate aberration on an object surface when an infinite distant light flux enters from the image side. FIG. 16A to FIG. 16F indicate that various aberrations at the wavelengths from the g-line to the C-line are favorably corrected. In addition, FIG. 17 indicates that axial chromatic aberrations from a short-wavelength region to a near-infrared wavelength region are favorably corrected.

What is claimed is:

1. A dry microscope objective, comprising, in order from an object side:
   a first lens group; and
   a second lens group,
   wherein the first lens group includes, in order from the object side:
      a first cemented lens with a concave surface facing the object side;
      a first single lens having a positive refractive power;
      a second single lens having a positive refractive power; and
      a second cemented lens with a concave surface facing an image side,
   wherein the second lens group includes, in order from the object side:
      a third cemented lens with a concave surface facing the object side; and
      a third single lens having a positive refractive power,
   wherein each of the first cemented lens, the second cemented lens, and the third cemented lens is a cemented doublet lens that combines one positive lens with one negative lens, and
   wherein the microscope objective satisfies conditional expressions of:

$0.31 \leq NA < 1$ (1);

$2.2 \leq H/f \leq 3.3$ (2); and $0 < a/b \leq 1.2$ (3), where NA is a numerical aperture of the microscope objective on the object side, f is a focal length of the microscope objective at e-line, H is a distance from an object surface to a lens surface of the second lens group closest to an image, a is a sum of air-gap distances in the first lens group, and b is a thickness of a negative lens included in the second cemented lens.

2. The microscope objective according to claim 1, wherein the microscope objective satisfies a conditional expression of $0 < a/c \leq 1.2$ (4)

where c is a thickness of a negative lens included in the first cemented lens.

3. The microscope objective according to claim 1, wherein the microscope objective satisfies a conditional expressions of:

$42 \leq vd(-) \leq 55$ (5); and $0.993 \leq \theta hF(-) \leq 1.036$ (6), where vd(−) is an Abbe number of a first negative lens at d-line, the first negative lens being a negative lens included in any one of the first cemented lens, the second cemented lens and the third cemented lens, and θhF(−) is a partial dispersion ratio based on h-line and F-line for the first negative lens.

4. The microscope objective according to claim 2, wherein the microscope objective satisfies a conditional expressions of:

$42 \leq vd(-) \leq 55$ (5); and $0.993 \leq \theta hF(-) \leq 1.036$ (6), where vd(−) is an Abbe number of a first negative lens at d-line, the first negative lens being a negative lens included in any one of the first cemented lens, the second cemented lens and the third cemented lens, and θhF(−) is a partial dispersion ratio based on h-line and F-line for the first negative lens.

5. The microscope objective according to claim 3, wherein the first negative lens is a negative lens included in the first cemented lens.

6. The microscope objective according to claim 4, wherein the first negative lens is a negative lens included in the first cemented lens.

7. The dry microscope objective according to claim 3, wherein the microscope objective satisfies a conditional expressions of:

$80 \leq vd(+) \leq 100$ (7); and $0.970 \leq \theta hF(+) \leq 0.985$ (8), where vd(+) is an Abbe number of a first positive lens at d-line, the first positive lens being the positive lens combined with the first negative lens, and θhF(+) is a partial dispersion ratio based on h-line and F-line for the first positive lens.

8. The dry microscope objective according to claim 4, wherein the microscope objective satisfies a conditional expressions of:

$80 \leq vd(+) \leq 100$ (7); and $0.970 \leq \theta hF(+) \leq 0.985$ (8), where vd(+) is an Abbe number of a first positive lens at d-line, the first positive lens being the positive lens combined with the first negative lens, and θhF(+) is a partial dispersion ratio based on h-line and F-line for the first positive lens.

9. The dry microscope objective according to claim 5, wherein the microscope objective satisfies a conditional expressions of:

$80 \leq vd(+) \leq 100$ (7); and $0.970 \leq \theta hF(+) \leq 0.985$ (8), where vd(+) is an Abbe number of a first positive lens at d-line, the first positive lens being the positive lens combined with the first negative lens, and θhF(+) is a partial dispersion ratio based on h-line and F-line for the first positive lens.

10. The dry microscope objective according to claim 6, wherein the microscope objective satisfies a conditional expressions of:

$80 \leq vd(+) \leq 100$ (7); and $0.970 \leq \theta hF(+) \leq 0.985$ (8), where vd(+) is an Abbe number of a first positive lens at d-line, the first positive lens being the positive lens combined with the first negative lens, and θhF(+) is a partial dispersion ratio based on h-line and F-line for the first positive lens.

11. The microscope objective according to claim 1, wherein the microscope objective satisfies a conditional expressions of:

$0 \leq |\Delta z|/DOF_e \leq 4.5$ (9), where $|\Delta z|$ is a difference between an axial best position at h-line and an axial best position at e-line, and $DOF_e$ is a depth of focus at e-line.

12. The microscope objective according to claim 2, wherein the microscope objective satisfies a conditional expressions of:

$$0 \leq |\Delta z|/DOF_e \leq 4.5 \qquad (9),$$

where $|\Delta z|$ is a difference between an axial best position at h-line and an axial best position at e-line, and $DOF_e$ is a depth of focus at e-line.

13. The microscope objective according to claim 3, wherein the microscope objective satisfies a conditional expressions of:

$$0 \leq |\Delta z|/DOF_e \leq 4.5 \qquad (9),$$

where $|\Delta z|$ is a difference between an axial best position at h-line and an axial best position at e-line, and $DOF_e$ is a depth of focus at e-line.

14. The microscope objective according to claim 4, wherein the microscope objective satisfies a conditional expressions of:

$$0 \leq |\Delta z|/DOF_e \leq 4.5 \qquad (9),$$

where $|\Delta z|$ is a difference between an axial best position at h-line and an axial best position at e-line, and $DOF_e$ is a depth of focus at e-line.

15. The microscope objective according to claim 5, wherein the microscope objective satisfies a conditional expressions of:

$$0 \leq |\Delta z|/DOF_e \leq 4.5 \qquad (9),$$

where $|\Delta z|$ is a difference between an axial best position at h-line and an axial best position at e-line, and $DOF_e$ is a depth of focus at e-line.

16. A dry microscope objective, comprising in order from an object side:
   a first lens group; and
   a second lens group,
   wherein the first lens group includes, in order from the object side:
      a first cemented lens with a concave surface facing the object side;
      a first single lens having a positive refractive power;
      a second single lens having a positive refractive power; and
      a second cemented lens with a concave surface facing an image side,
   wherein the second lens group includes, in order from the object side:
      a third cemented lens with a concave surface facing the object side; and
      a third single lens having a positive refractive power,
   wherein each of the first cemented lens, the second cemented lens, and the third cemented lens is a cemented doublet lens that combines one positive lens with one negative lens, and
   wherein the microscope objective satisfies conditional expressions of:

$$0.31 \leq NA < 1 \qquad (1);$$

$$2.2 \leq H/f \leq 3.3 \qquad (2);$$

$$42 \leq vd(-) \leq 55 \qquad (5); \text{ and}$$

$$0.993 \leq \theta hF(-) \leq 1.036 \qquad (6),$$

where NA is a numerical aperture of the microscope objective on the object side, f is a focal length of the microscope objective at e-line, H is a distance from an object surface to a lens surface of the second lens group closest to an image, $vd(-)$ is an Abbe number of a first negative lens at d-line, the first negative lens being a negative lens included in any one of the first cemented lens, the second cemented lens and the third cemented lens, and $\theta hF(-)$ is a partial dispersion ratio based on h-line and F-line for the first negative lens.

17. The microscope objective according to claim 16, wherein the first negative lens is a negative lens included in the first cemented lens.

18. The dry microscope objective according to claim 16, wherein the microscope objective satisfies a conditional expressions of:

$$80 \leq vd(+) \leq 100 \qquad (7); \text{ and}$$

$$0.970 \leq \theta hF(+) \leq 0.985 \qquad (8),$$

where $vd(+)$ is an Abbe number of a first positive lens at d-line, the first positive lens being the positive lens combined with the first negative lens, and $\theta hF(+)$ is a partial dispersion ratio based on h-line and F-line for the first positive lens.

19. The microscope objective according to claim 16, wherein the microscope objective satisfies a conditional expressions of:

$$0 \leq |\Delta z|/DOF_e \leq 4.5 \qquad (9),$$

where $|\Delta z|$ is a difference between an axial best position at h-line and an axial best position at e-line, and $DOF_e$ is a depth of focus at e-line.

20. A dry microscope objective, comprising in order from an object side:
   a first lens group; and
   a second lens group,
   wherein the first lens group includes, in order from the object side:
      a first cemented lens with a concave surface facing the object side;
      a first single lens having a positive refractive power;
      a second single lens having a positive refractive power; and
      a second cemented lens with a concave surface facing an image side,
   wherein the second lens group includes, in order from the object side:
      a third cemented lens with a concave surface facing the object side; and
      a third single lens having a positive refractive power,
   wherein each of the first cemented lens, the second cemented lens, and the third cemented lens is a cemented doublet lens that combines one positive lens with one negative lens, and
   wherein the microscope objective satisfies conditional expressions of:

$$0.31 \leq NA < 1 \qquad (1);$$

$$2.2 \leq H/f \leq 3.3 \qquad (2); \text{ and}$$

$$0 \leq |\Delta z|/DOF_e \leq 4.5 \qquad (9),$$

where NA is a numerical aperture of the microscope objective on the object side, f is a focal length of the microscope objective at e-line, H is a distance from an object surface to a lens surface of the second lens group closest to an image, |Δz| is a difference between an axial best position at h-line and an axial best position at e-line, and $DOF_e$ is a depth of focus at e-line.

* * * * *